US012687094B2

(12) United States Patent (10) Patent No.: US 12,687,094 B2
Inyang et al. (45) Date of Patent: Jul. 21, 2026

(54) FRACTURE EVENT DETECTION

(71) Applicant: Halliburton Energy Services, Inc., Houston, TX (US)

(72) Inventors: Ubong Akpan Inyang, Humble, TX (US); Dinesh Ananda Shetty, Sugar Land, TX (US); Jie Bai, Katy, TX (US); Srividhya Sridhar, Bellaire, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 1049 days.

(21) Appl. No.: 17/859,443

(22) Filed: Jul. 7, 2022

(65) Prior Publication Data

US 2024/0011377 A1 Jan. 11, 2024

(51) Int. Cl.
*E21B 43/26* (2006.01)
*G01V 1/28* (2006.01)

(52) U.S. Cl.
CPC .............. *E21B 43/26* (2013.01); *G01V 1/288* (2013.01); *E21B 2200/20* (2020.05); *E21B 2200/22* (2020.05); *G01V 2210/1234* (2013.01); *G01V 2210/646* (2013.01)

(58) Field of Classification Search
CPC .. E21B 43/26; E21B 2200/20; E21B 2200/22; E21B 47/06; G01V 1/288; G01V 2210/1234; G01V 2210/646
See application file for complete search history.

(56) References Cited

U.S. PATENT DOCUMENTS

| | | | |
|---|---|---|---|
| 10,422,207 B2 | 9/2019 | Aidagulov et al. | |
| 2012/0234534 A1 | 9/2012 | Hughes et al. | |
| 2016/0146962 A1 | 5/2016 | Hayward | |
| 2022/0027538 A1 | 1/2022 | Walters et al. | |
| 2022/0403724 A1* | 12/2022 | Haustveit | E21B 47/06 |

OTHER PUBLICATIONS

Saeed et al. "Event Detection for Managed-Pressure Drilling: A New Paradigm" 2012 (Year: 2012).*

(Continued)

*Primary Examiner* — Rehana Perveen
*Assistant Examiner* — Troy A Maust
(74) *Attorney, Agent, or Firm* — NOVAK DRUCE CARROLL LLP

(57) ABSTRACT

Aspects of the subject technology relate to systems, methods, and computer-readable media for detecting and marking events that occur during a fracturing operation. Data related to performance of a fracturing operation in a wellbore during performance of a stage of the fracturing operation can be accessed. An event detection algorithm for detecting a specific event during the fracturing operation can be accessed. The event detection algorithm can be applied to the data to determine whether the specific event actually occurs during at least a portion of the stage of the fracturing operation. As follows, an indication of the specific event occurring during the stage of the fracturing operation can generated if it is determined that the specific event actually occurred during the at least a portion of the stage of the fracturing operation.

19 Claims, 13 Drawing Sheets

(56)                References Cited

OTHER PUBLICATIONS

Abstract of Shen, Yuchang et al., "Development of a Ball Seat Event Recognition Algorithm with Convolutional Neural Network for the Real-Time Hydraulic Fracturing Analytics System", SPE-200003-MS; SPE Canada Unconventional Resources Conference, Sep. 24, 2020.

Abstract of Hlidek, Barry T. et al., "Proven Hydraulic Fracturing Field Applications for Real-Time Visualization and Monitoring System", SPE-187126-MS; SPE Annual Technical Conference and Exhibition, San Antonio, Texas, USA, Oct. 9, 2017.

Abstract of Augustine, Jody et al., "Modeling the Dynamic Pressure Response of Ball-Actuated Stimulation Sleeves", SPE-127821-PA; SPE Prod & Oper 26 (02): 162-172; https://doi.org/10.2118/127821-PA; Mar. 17, 2011.

Abstract of Jamaloei, Benyamin Yadall, " The First Out-of-Sequence-Fracturing Field Test In North America: Key Learnings from Operation, Petrophysical Analysis, Fracture Modeling, and Production History Matching", SPE-197227-PA; SPE Prod & Oper 35 (04): 0809-0835; https://doi.org/10.2118/197227-PA; Nov. 12, 2020.

Abstract of Siddiqui, Fahd et al., "Improving Operational Efficiency Using Automated Time Analysis for Multi-Well Pad Fracturing", SPE-207318-MS; Abu Dhabi International Petroleum Exhibition & Conference, Abu Dhabi, UAE; Dec. 9, 2021.

Abstract of Ramirez, Alberto Jose et al., "Novel Application to Recognize a Breakdown Pressure Event on Time Series Frac Data Vs. an Artificial Intelligence Approach", SPE-200846-MS; SPE Western Regional Meeting, Virtual, Apr. 10, 2021.

Abstract of Ramirez, Alberto et al., "Event Recognition on Time Series Frac Data Using Machine Learning", SPE-195317-MS; SPE Western Regional Meeting, San Jose, California, USA; Apr. 22, 2019.

Abstract of Abstract of Ramirez, Alberto et al., "Event Recognition on Time Series Frac Data using Machine Learning—Part II", SPE-197093-MS; SPE Liquids-Rich Basins Conference—North America, Odessa, Texas, USA; Oct. 30, 2019.

* cited by examiner

700

702

Open Well

Pressure

Time

750

752

Open Well

Pressure

Time

1000 ⟍

Pressure Breakdown Event Volume to Wellbore
Displacement Volume at Treatment Depth

1050 ⟍

1100

1150

1200

1250

1300

FRACTURE EVENT DETECTION

TECHNICAL FIELD

The present technology pertains to detecting and marking events that occur during a fracturing operation, and more particularly to selecting and applying specific event detection algorithms to detect specific events based on the detection of related events.

BACKGROUND

Completion of a wellbore through hydraulic fracturing is a complex process. Specifically, the hydraulic fracturing process includes a number of different variables, e.g. surface variables, that can be altered to perform a well completion. As follows, a large number events occur both at the surface and downhole during the hydraulic fracturing process. Such events can be used in controlling the variables and ultimately the hydraulic fracturing process. In particular, the variables can be automatically controlled based on certain events occurring and not occurring to automate at least portion of the fracturing process.

Automating the fracturing process can provide numerous advantages in terms of consistency, safety, reliability, efficiency, and improved performance in various aspects of the fracturing process. However, it is difficult to both accurately and consistently detect and report events that occur during the fracturing process. In particular, an operator is usually relied on to monitor diagnostic data in real time and flag events as they happen based on such diagnostics data. As follows, this makes it difficult to correctly automate the fracturing process and realize the benefits of process automation.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
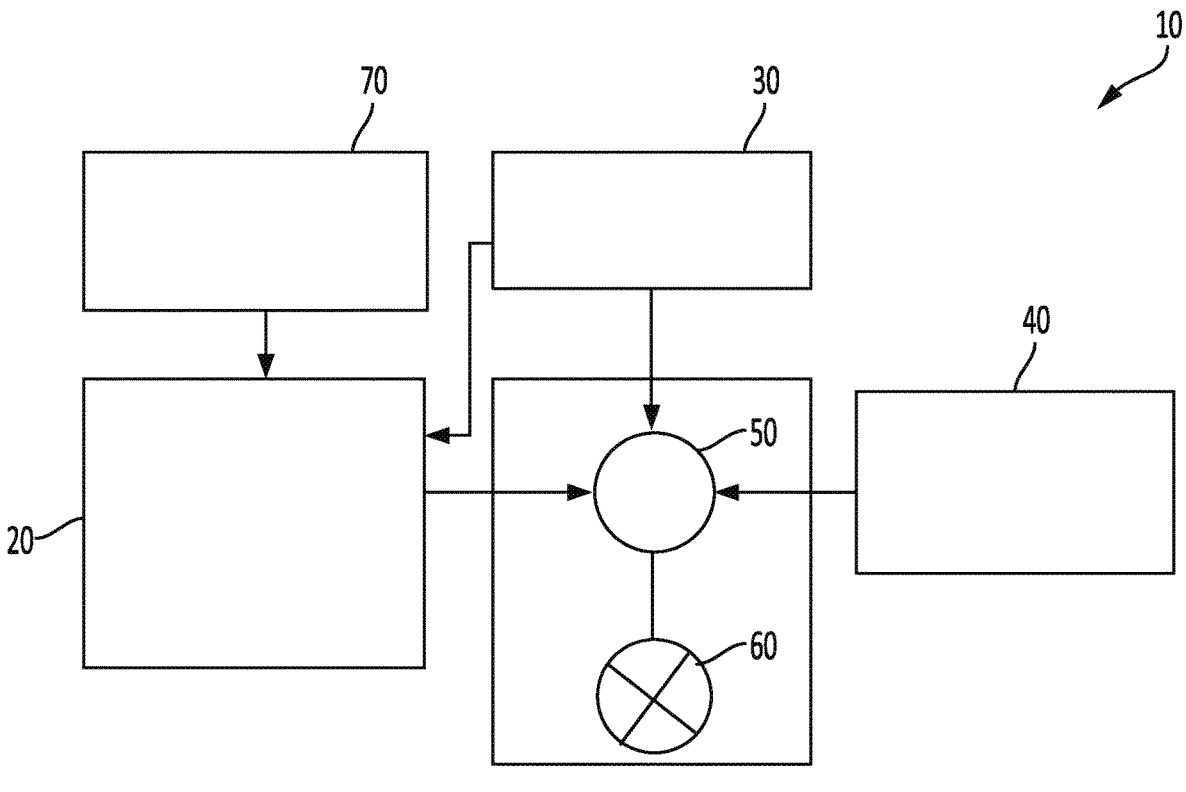
FIG. 1 is a schematic diagram of an example fracturing system, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Subterranean hydraulic fracturing is conducted to increase or "stimulate" production from a hydrocarbon well. To conduct a fracturing process, pressure is used to pump special fracturing fluids, including some that contain propping agents ("proppants"), down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To begin a fracturing process, at least one perforation is made at a particular down-hole location through the well into a subterranean formation, e.g. through a wall of the well casing, to provide access to the formation for the fracturing fluid. The direction of the perforation attempts to determine at least the initial direction of the fracture.

A first "mini-fracture" test can be conducted in which a relatively small amount of proppant-free fracturing fluid is pumped into the formation to determine and/or confirm at least some of the properties of the formation, such as the permeability of the formation itself. Accurately knowing the permeability allows for a prediction of the fluid leak-off rate at various pressures, whereby the amount of fracturing fluid that will flow into the formation can be considered in establishing a pumping and proppant schedule. Thus, the total amount of fluid to be pumped down-hole is at least the sum of the cased volume of the well, the amount of fluid that fills the fracture, and the amount of fluid that leaks-off into the formation during the fracturing process itself. Leak-off rate is an important parameter because once proppant-laden fluid is pumped into the fracture, leak-off can increase the concentration of the proppant in the fracturing fluid beyond a target level. Data from the mini-fracture test then is usually used by experts to confirm or modify the original desired target profile of the fracture and the completion process used to achieve the fracture.

Fracturing then begins in earnest by first pumping proppant-free fluid into the wellbore or through tubing. The fracture is initiated and begins to grow in height, length, and/or width. This first proppant-free stage is usually called the "pre-pad" and consists of a low viscosity fluid. A second fluid pumping stage is usually then conducted of a different viscosity proppant-free fluid called the "pad." At a particular time in the pumping process, the proppant is then added to a fracturing and propping flow stream using a continuous blending process, and is usually gradually stepped-up in proppant concentration. The resultant fractures are then filled with proppant to stabilize the fractures.

This process can be repeated in a plurality of fracturing stages to form a plurality of fractures through a wellbore, e.g. as part of a well completion phase. In particular and as will be discussed in greater detail later, this process can be repeatedly performed through a plug-and-perf technique to form the fractures throughout a subterranean formation. After the fractures are formed, resources, e.g. hydrocarbons, can be extracted from the fractures during a well production phase.

Completion of a wellbore through hydraulic fracturing is a complex process. Specifically, the hydraulic fracturing process includes a number of different variables, e.g. surface variables, that can be altered to perform a well completion. As follows, a large number events occur both at the surface and downhole during the hydraulic fracturing process. Such events can be used in controlling the variables and ultimately the hydraulic fracturing process. In particular, the variables can be automatically controlled based on certain events occurring and not occurring to automate at least portion of the fracturing process.

Automating the fracturing process can provide numerous advantages in terms of consistency, safety, reliability, efficiency, and improved performance in various aspects of the fracturing process. However, it is difficult to both accurately and consistently detect and report events that occur during the fracturing process. In particular, an operator is usually relied on to monitor diagnostic data in real time and flag events as they happen based on such diagnostics data. As follows, this makes it difficult to correctly automate the fracturing process and realize the benefits of process automation.

The disclosed technology addresses the foregoing by selecting an event detection algorithm and applying the event detection algorithm, potentially in real-time, to data related to performance of a fracturing operation. In turn, a specific event can be detected based on application of the event detection algorithm and an indication of the specific event can be generated in response to detection of the event.

In various embodiments, a method comprises accessing data related to performance of a fracturing operation in a wellbore during performance of a stage of the fracturing operation. The method also comprises accessing an event detection algorithm for detecting a specific event that occurs during the fracturing operation. Further, the method comprises applying, during at least a portion of the stage of the fracturing operation, the event detection algorithm to the data to determine whether the specific event actually occurs during the at least a portion of the stage of the fracturing operation. Additionally, the method comprises generating an indication of the specific event occurring during the stage of the fracturing operation if it is determined that the specific event actually occurred during the at least a portion of the stage of the fracturing operation.

In various embodiments, a system comprises one or more processors and at least one computer-readable storage medium having stored therein instructions, which when executed by the one or more processors, cause the one or more processors to access data related to performance of a fracturing operation in a wellbore during performance of a stage of the fracturing operation. The instructions can also cause the one or more processors to access an event detection algorithm for detecting a specific event that occurs during the fracturing operation. Further, the instructions can cause the one or more processors to apply, during at least a portion of the stage of the fracturing operation, the event detection algorithm to the data to determine whether the specific event actually occurs during the at least a portion of the stage of the fracturing operation. Additionally, the instructions can cause the one or more processors to generate an indication of the specific event occurring during the stage of the fracturing operation if it is determined that the specific event actually occurred during the at least a portion of the stage of the fracturing operation.

In various embodiments, a non-transitory computer-readable storage medium having stored therein instructions which, when executed by one or more processors, cause the one or more processors to access data related to performance of a fracturing operation in a wellbore during performance of a stage of the fracturing operation. The instructions can also cause the one or more processors to access an event detection algorithm for detecting a specific event that occurs during the fracturing operation. Further, the instructions can cause the one or more processors to apply, during at least a portion of the stage of the fracturing operation, the event detection algorithm to the data to determine whether the specific event actually occurs during the at least a portion of the stage of the fracturing operation. Additionally, the instructions can cause the one or more processors to generate an indication of the specific event occurring during the stage of the fracturing operation if it is determined that the specific event actually occurred during the at least a portion of the stage of the fracturing operation.

Turning now to FIG. 1, an example fracturing system 10 is shown. The example fracturing system 10 shown in FIG. 1 can be implemented using the systems, methods, and techniques described herein. In particular, the disclosed system, methods, and techniques may directly or indirectly affect one or more components or pieces of equipment associated with the example fracturing system 10, according to one or more embodiments. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a hydrated fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. As will be discussed in greater detail later, the additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or hydrocarbon and hydrocarbon mixture powered pumps. Specifically, the pumps in the pump and blender system 50 can include electric pumps, diesel powered pumps, natural gas powered pumps, and diesel combined with natural gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source may be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
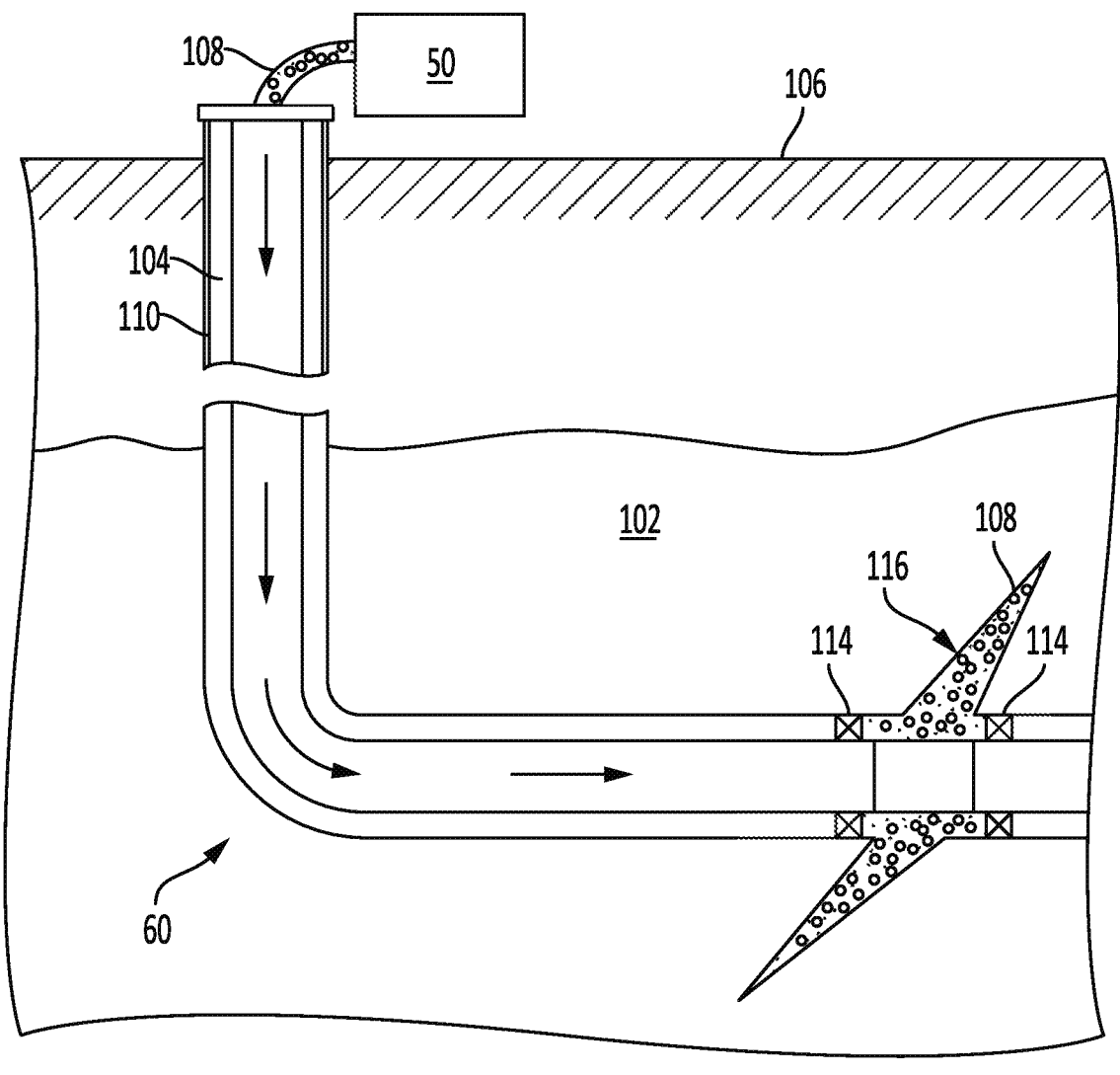
FIG. 2 shows a well during a fracturing operation in a portion of a subterranean formation of interest surrounding a wellbore, in accordance with various aspects of the subject technology.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. As will be discussed in greater detail below, perforations can be formed in the casing 110 using an applicable wireline-free actuation. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, as will be discussed in greater detail below, greater than two perforations can be formed in the wellbore 104, e.g. along the top side of the wellbore 104, as part of a perforation cluster. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
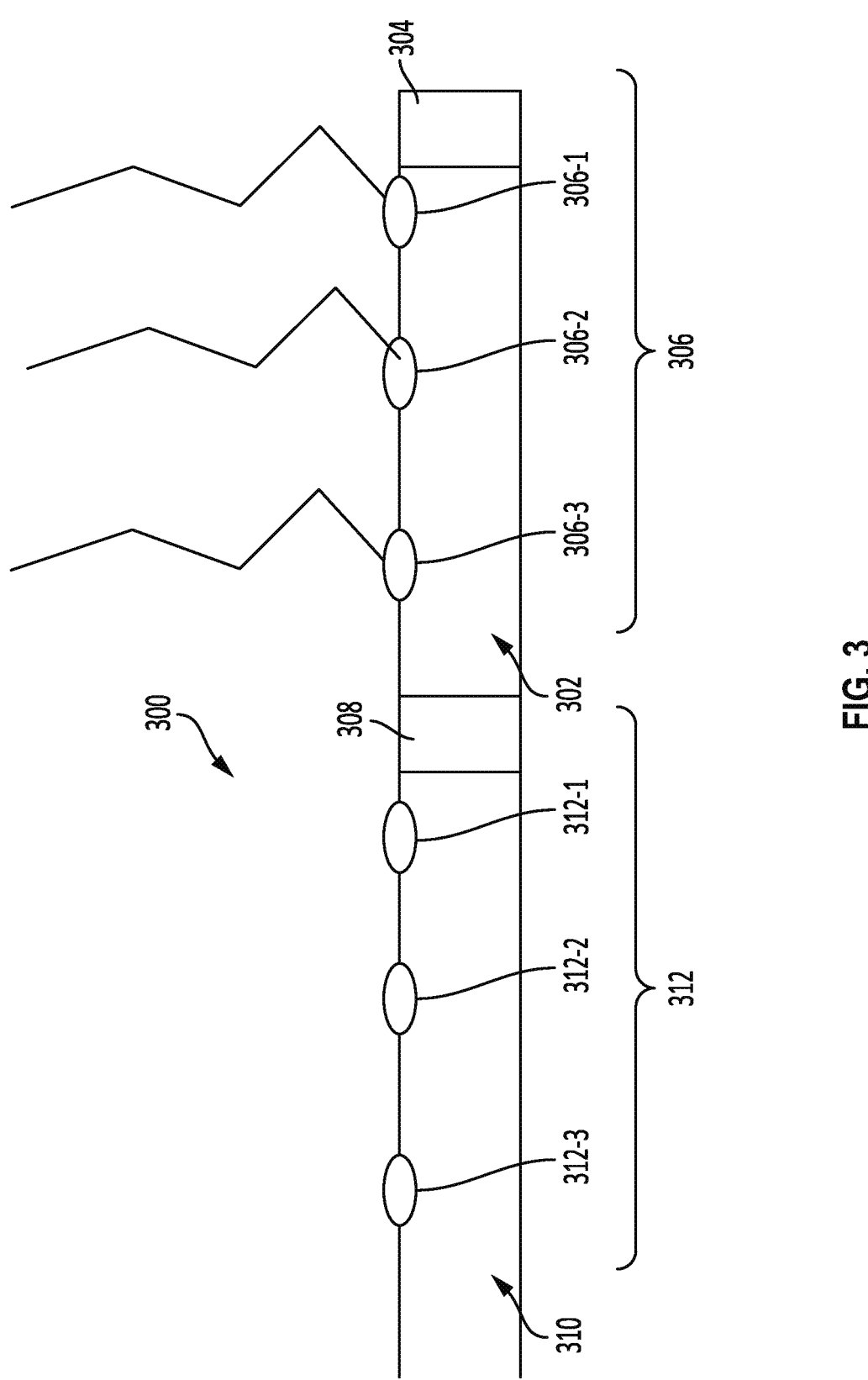
FIG. 3 shows a portion of a wellbore that is fractured using multiple fracture stages, in accordance with various aspects of the subject technology.

FIG. 3 shows a portion of a wellbore 300 that is fractured using multiple fracture stages. Specifically, the wellbore 300 is fractured in multiple fracture stages using a plug-and-perf technique.

The example wellbore 300 includes a first region 302 within a portion of the wellbore 300. The first region 302 can be positioned in proximity to a terminal end of the wellbore 300. The first region 302 is formed within the wellbore 300, at least in part, by a plug 304. Specifically, the plug 304 can function to isolate the first region 302 of the wellbore 300 from another region of the wellbore 300, e.g. by preventing the flow of fluid from the first region 302 to the another region of the wellbore 300. The region isolated from the first region 302 by the plug 304 can be the terminal region of the wellbore 300. Alternatively, the region isolated from the first region 302 by the plug 304 can be a region of the wellbore 300 that is closer to the terminal end of the wellbore 300 than the first region 302. While the first region 302 is shown in FIG. 3 to be formed, at least in part, by the plug 304, in various embodiments, the first region 302 can be formed, at least in part, by a terminal end of the wellbore 300 instead of the plug 304. Specifically, the first region 302 can be a terminal region within the wellbore 300.

The first region 302 includes a first perforation 306-1, a second perforation 306-2, and a third perforation 306-3. The first perforation 306-1, the second perforation 306-2, and the third perforation 306-3 can form a perforation cluster 306 within the first region 302 of the wellbore 300. While three perforations are shown in the perforation cluster 306, in various embodiments, the perforation cluster 306 can include fewer or more perforations. As will be discussed in greater detail later, fractures can be formed and stabilized within a subterranean formation through the perforations 306-1, 306-2, and 306-3 of the perforation cluster 306 within the first region 302 of the wellbore 300. Specifically, fractures can be formed and stabilized through the perforation cluster 306 within the first region 302 by pumping fracturing fluid and solid particles into the first region 302 and through the perforations 306-1, 306-2, and 306-3 into the subterranean formation.

The example wellbore 300 also includes a second region 310 positioned closer to the wellhead than the first region 302. Conversely, the first region 302 is in closer proximity to a terminal end of the wellbore 300 than the second region 310. For example, the first region 302 can be a terminal region of the wellbore 300 and therefore be positioned closer to the terminal end of the wellbore 300 than the second region 310. The second region 310 is isolated from the first region 302 by a plug 308 that is positioned between the first region 302 and the second region 310. The plug 308 can fluidly isolate the second region 310 from the first region 302. As the plug 308 is positioned between the first and second regions 302 and 310, when fluid and solid particles are pumped into the second region 310, e.g. during a fracture stage, the plug 308 can prevent the fluid and solid particles from passing from the second region 310 into the first region 302.

The second region 310 includes a first perforation 312-1, a second perforation 312-2, and a third perforation 312-3. The first perforation 312-1, the second perforation 312-2, and the third perforation 312-3 can form a perforation cluster 312 within the second region 310 of the wellbore 300. While three perforations are shown in the perforation cluster 312, in various embodiments, the perforation cluster 312 can include fewer or more perforations. As will be discussed in greater detail later, fractures can be formed and stabilized within a subterranean formation through the perforations 312-1, 312-2, and 312-3 of the perforation cluster 312 within the second region 310 of the wellbore 300. Specifically, fractures can be formed and stabilized through the perforation cluster 312 within the second region 310 by pumping fracturing fluid and solid particles into the second region 310 and through the perforations 312-1, 312-2, and 312-3 into the subterranean formation.

In fracturing the wellbore 300 in multiple fracturing stages through a plug-and-perf technique, the perforation cluster 306 can be formed in the first region 302 before the second region 310 is formed using the plug 308. Specifically, the perforations 306-1, 306-2, and 306-3 can be formed before the perforations 312-1, 312-2, and 312-3 are formed in the second region 310. As will be discussed in greater detail later, the perforations 306-1, 306-2, and 306-3 can be formed using a wireline-free actuation. Once the perforations 306-1, 306-2, and 306-3 are formed, fracturing fluid and solid particles can be transferred through the wellbore 300 into the perforations 306-1, 306-2, and 306-3 to form and stabilize fractures in the subterranean formation as part of a first fracturing stage. The fracturing fluid and solid particles can be transferred from a wellhead of the wellbore 300 to the first region 302 through the second region 310 of the wellbore 300. Specifically, the fracturing fluid and solid particles can be transferred through the second region 310 before the second region 310 is formed, e.g. using the plug 308, and the perforation cluster 312 is formed. This can ensure, at least in part, that the fracturing fluid and solid particles flow through the second region 310 and into the subterranean formation through the perforations 306-1, 306-2, and 306-3 within the perforation cluster 306 in the first region 302.

After the fractures are formed through the perforations 306-1, 306-2, and 306-3, the wellbore 300 can be filled with the plug 308. Specifically, the wellbore 300 can be plugged with the plug 308 to form the second region 310. Then, the perforations 312-1, 312-2, and 312-3 can be formed, e.g. using a wireline-free actuation. Once the perforations 312-1, 312-2, and 312-3 are formed, fracturing fluid and solid particles can be transferred through the wellbore 300 into the perforations 312-1, 312-2, and 312-3 to form and stabilize fractures in the subterranean formation as part of a second fracturing stage. The fracturing fluid and solid particles can be transferred from the wellhead of the wellbore 300 to the second region 310 while the plug 308 prevents transfer of the fluid and solid particles to the first region 302. This can effectively isolate the first region 302 until the first region 302 is accessed for production of resources, e.g. hydrocarbons. After the fractures are formed through the perforation cluster 312 in the second region 310, a plug can be positioned between the second region 310 and the wellhead, e.g. to fluidly isolate the second region 310. This process of forming perforations, forming fractures during a fracture stage, followed by plugging on a region by region basis can be repeated. Specifically, this process can be repeated up the wellbore towards the wellhead until a completion plan for the wellbore 300 is finished.

Figure 4:
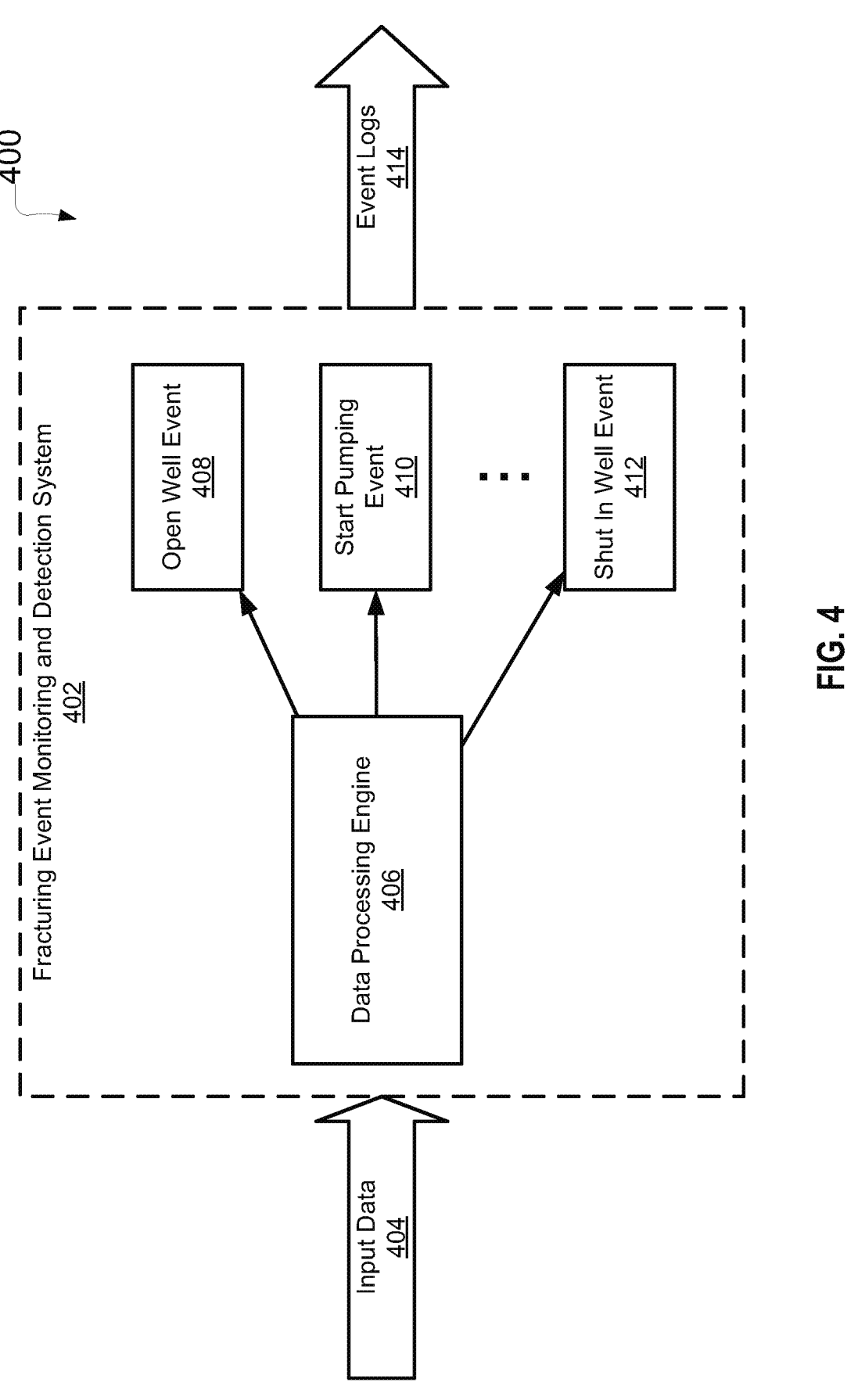
FIG. 4 shows an example system for detecting and logging events during a fracturing process, in accordance with various aspects of the subject technology.

FIG. 4 shows an example system 400 for detecting and logging events during a fracturing process. The system 400 can be configured to detect and log events in real time or semi-real time in correlation with the gathering of data associated with a fracturing process. For example, the system 400 can monitor pressure data as the pressure data is gathered/generated to detect the occurrence of events in real time or semi-real time. Further, the system 400 can be configured to detect and log events during specific stages of a fracturing process.

The system 400 can be integrated as part of technology for automating at least portions of a fracturing process. Specifically, the system 400 can identify and log events that are used to control a fracturing process for a wellbore, e.g. according to a fracturing completion plan. A fracturing completion plan, as used herein, can specify how to perform hydraulic fracturing to achieve a target completion in a wellbore. A target completion in a wellbore can specify desired characteristics of a hydraulic fracturing completion in a wellbore. For example, a target completion can include fractures that extend anywhere from between 80 and 100 feet into a reservoir to several hundred feet into the reservoir. Further in the example, the target completion can include that the fractures are formed at locations through the wellbore that are spaced apart from each other by 10 feet. A target completion can be specified by a customer. As follows, the fracturing completion job can be performed to achieve, or otherwise attempt to achieve, the target completion for the customer.

In controlling a fracturing process for a wellbore according to events identified and logged by the system 400, values of fracturing completion parameters can be varied, e.g. in an automated fashion. Such values can vary across different fracturing completion plans. In turn, different fracturing completion plans, corresponding to different values of fracturing completion parameters and/or reservoir parameters, can be applied in performing the fracturing completion job, e.g. to achieve the target completion. For example, an initial fracturing completion plan can be applied as part of automated control of the fracturing process. Subsequently, a modified fracturing completion parameter with a changed fracturing completion parameter can be applied as part of controlling the fracturing process in an automated fashion.

Fracturing completion parameters, as used herein, can include applicable parameters that can be varied or otherwise controlled during a fracturing process. Fracturing completion parameters can include applicable parameters related to perforation/opening formation in a wellbore as part of performing hydraulic fracturing. For example, fracturing completion parameters can include parameters related to control of a wireline or a non-wireline technique for forming perforations in a wellbore as part a hydraulic fracturing process.

Further, fracturing completion parameters can include applicable parameters related to fracture creation and stabilization into a medium through perforations/opening in a wellbore as part of performing hydraulic fracturing. Specifically, fracturing completion parameters can include fluid control parameters related to hydraulic fracturing. For example, fracture completion parameters can include a rate at which fluid is pumped into a wellbore for forming fractures through the wellbore. Further, fracturing completion parameters can include proppant control parameters related to hydraulic fracturing. For example, fracture completion parameters can include a type of proppant that is pumped into a wellbore, a rate at which the proppant is pumped into the wellbore, and applicable proppant concentration ramp characteristics for stabilizing fractures through the wellbore. Additionally, fracturing completion parameters can include additive control parameters. For example, fracture completion parameters can include an amount of at least one of a viscosifier, a friction reducer, a diverter agent, a pH adjustment agent, a surfactant, a clay stabilizer, a formation stabilizer, a viscosity breaker additive, and other applicable additives to add to a proppant mixture pumped down a wellbore for stabilizing fractures through the wellbore.

The example system 400 shown in FIG. 4 includes a fracturing event monitoring and detection system 402. The fracturing event monitoring and detection system 402 can access or otherwise receive input data 404. The input data 404 can then be analyzed or otherwise monitored by the fracturing event monitoring and detection system 402 to detect events occurring during the fracturing process, e.g. in real time or semi-real time. Events of a fracturing operation, as used herein, include applicable events that occur during a fracturing operation and are capable of being detected by the fracturing event monitoring and detection system 402. For example, events can include an open well event 408, a start pumping event 410, and a shut in well event 412. Further, events can include a ball seat event, a pressure breakdown event, a stop pumping event, a diverter drop event, and a pump acid event.

The input data 404 accessed by the fracturing event monitoring and detection system 402 includes applicable data that can be gathered and subsequently analyzed for determining whether events have occurred or not occurred during the fracturing process. Specifically, the input data 404 can include equipment data, sensor data, treatment status data, user input data, or a combination there. Equipment data includes applicable data gathered in association with operation of one or more pieces of equipment during a fracturing operation. Sensor data includes applicable data gathered by one or more sensors during a fracturing operation. Treatment status data includes applicable data describing characteristics of a treatment that is or will be applied during a fracturing operation.

The input data 404 can include surface diagnostics data at the fracturing operation/completion job, otherwise referred to as real time fracturing data. Surface diagnostics data can describe applicable surface observations at the fracturing completion job. For example, surface diagnostics data can describe surface pressures or monitoring well pressures at one or more wellbores of the fracturing completion job, injection characteristics of either or both fluid and proppant into the one or more wellbores, and injection characteristics of one or more additives into the one or more wellbores. More specifically, surface diagnostics data can describe rates at which a diverter is introduced into a wellbore as part of a diverter stage of the fracturing completion job. Surface diagnostics data can be gathered by applicable sensors, equipment, and surface monitoring techniques associated with hydraulic fracturing. For example, surface diagnostics data can be gathered by flow sensors integrated at wellheads of a pad.

Additionally, the input data 404 can include subsurface diagnostics data at the fracturing completion job, otherwise referred to as real time diagnostics data. Subsurface diagnostics data can describe applicable subsurface diagnostics occurring at the fracture completion job. Specifically, subsurface diagnostics data can describe flowrates per perforation cluster in a wellbore of the fracturing completion job, flowrates per perforation in the wellbore, temperature on stages in the wellbore, microseismic activity in the wellbore, acoustic measurements in the wellbore, strain measurements in the wellbore, bottom hole pressure in the wellbore, and instantaneous shut in pressures in the wellbore. Shut in pressure, as used herein, includes a pressure in a wellbore once fluid, proppant, and additives are no longer pumped into the wellbore at a completion of a fracture creation and stabilization stage. Subsurface diagnostics data can be gathered through applicable sensors, equipment, and subsurface monitoring techniques associated with hydraulic fracturing. For example, subsurface diagnostics data at the fracturing completion job can be gathered using one or more fiber optic cables, e.g. fiber optic cables integrated with one or more wellbores of the fracturing completion job. In another example, subsurface diagnostics data at the fracturing completion job can be gathered by one or more acoustic sensors, e.g. acoustic sensors integrated with one or more wellbores of the fracturing completion job. In yet another example, subsurface diagnostics data at the fracturing completion job can be gathered by one or more strain sensors, e.g. strain sensors integrated with one or more wellbores of the fracturing completion job. In another example, subsurface diagnostics data can be gathered by systems and equipment that measure casing strain and/or well deformation in a wellbore.

Both the surface diagnostics data and the subsurface diagnostics data can be gathered by monitoring off-set wells. Specifically, surface diagnostics data and subsurface diagnostics data for a well can be gathered by monitoring an adjacent well, similar to as is previously discussed with respect to off-set well monitoring. For example, microseismic activity in a well can be monitored through a fiber optic cable implemented in an adjacent well. Further in the example, the monitored well can function only as a monitoring well in which fracturing operations are not actually performed.

The fracturing event monitoring and detection system 402 includes a data processing engine 406. The data processing engine 406 functions to monitor the input data 404 to detect the occurrence or non-occurrence of events, otherwise referred to as detecting events, during the fracturing operation. In detecting events, the data processing engine 406 can select one or more event detection algorithms for detecting one or more specific events during the fracturing operation. In turn, the data processing engine 406 can apply the selected event detection algorithms to the input data to detect the one or more specific events.

An event detection algorithm can be unique to a specific event. In particular, an event detection algorithm can be designed to detect a specific event. For example, an event detection algorithm can be ball seat event detection algorithm that is configured to detect a ball seat event. In being unique to a specific event and configured to detect the specific event, an event detection algorithm can be configured to monitor one or more specific types of data to identify the specific event. For example, a pressure breakdown event detection algorithm can be configured to monitor wellhead pressure to detect the occurrence of a pressure breakdown event.

Events that are detected by the event detection algorithms can be related to each other. In being related to each other, an event can be dependent on another event and/or necessarily occur, at least in part, after the another event. For example, a ball seat event can be related to an open well event and occur after the open well event. In another example, a pressure break down event can be related to a ball seal event and occur after the ball seat event. are related and define input constrains for corresponding event detection algorithms.

Event detection algorithms can be configured to detect an occurrence of a specific event based on a related event. Specifically, an event detection algorithm can be configured to detect an occurrence of a specific event based on an occurrence of a related event. More specifically, a related event can serve as an input constraint for an event detection algorithm for another related event. For example, an occurrence of a ball seat event can serve as an input constraint for an event detection algorithm for detecting a pressure breakdown event. As follows, event statuses can be communicated between different event detection algorithms to determine whether input constraints for the algorithms are satisfied.

Alternatively, events can be independent from each other. In turn, corresponding event detection algorithms for detecting the independent events can be configured to detect the independent events agnostic as to the occurrence of other specific events. For example, an open well event can be independent of other events. As follows, an open well event detection algorithm can detect an open well event irrespective of the occurrence of other events.

In selecting and applying an event detection algorithm from a plurality of event detection algorithms, the data processing engine 406 can refrain from applying at least a subset of the plurality of event detection algorithms. In particular, the data processing engine 406 can refrain from applying all or a portion of the event detection algorithms that are not selected. For example, the data processing engine 406 can select a start pumping event algorithm from a plurality of event detection algorithms that includes a closed well detection algorithm. As follows, the data processing engine 406 can, based on selecting the start pumping event algorithm, refrain from applying the closed well detection algorithm. This is advantageous because, as will be discussed in greater detail later, computational resources are not wasted by applying an event detection algorithm which is either not selected or irrelevant to a current progress of or time during a fracturing operation.

After detecting one or more events, the fracturing event monitoring and detection system 402 can output an event log 414 to indicate the occurrence of such detected events. The outputted event logs 414 can be in a form that is capable of being reproduced in a perceivable manner by a human. In turn, operators can use the event logs to monitor a fracturing operation. Further, the outputted event logs 414 can serve as input for automatically controlling a fracturing operation. The event logs 414 can be sent through an applicable communication technique, otherwise according to an applicable protocol. Specifically, the event logs 414 can be sent to control or monitoring systems through an MQ Telemetry Transport (herein "MQTT") messaging protocol.

Figure 5:
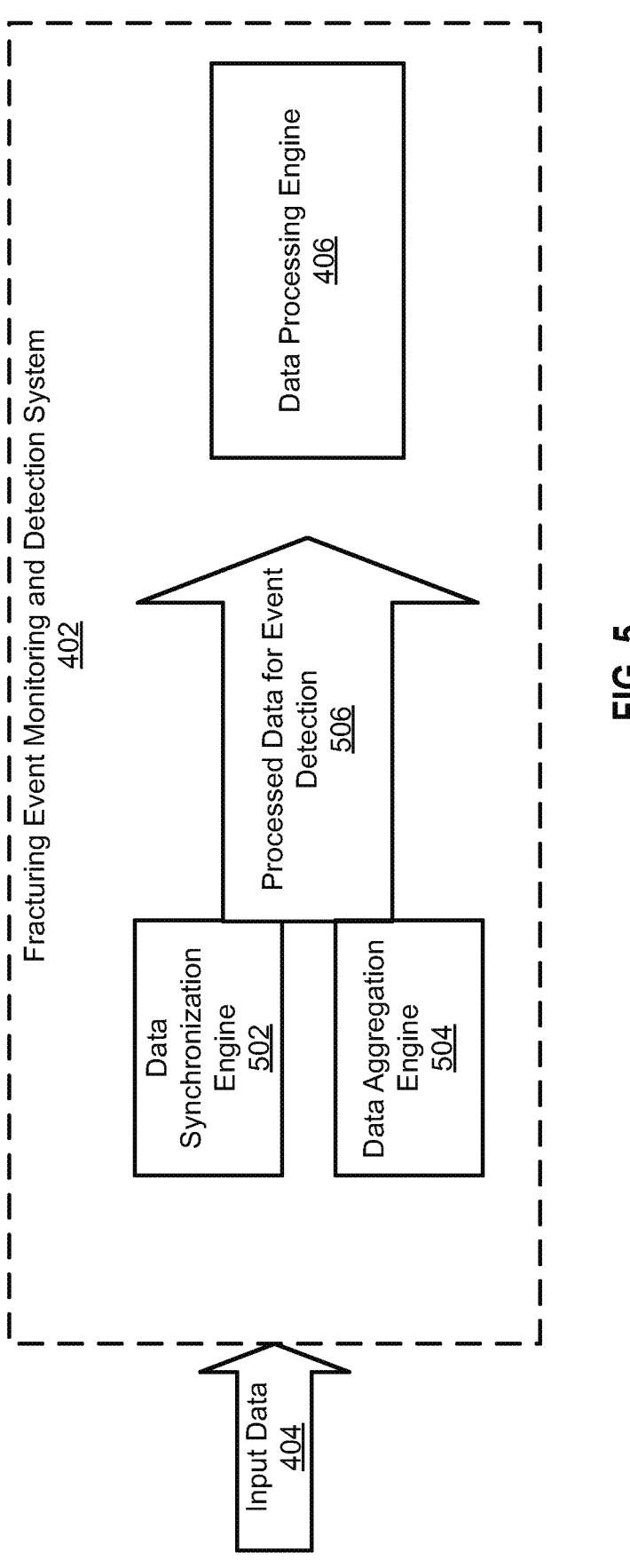
FIG. 5 illustrates another example of the fracturing event monitoring and detection system, in accordance with various aspects of the subject technology.

FIG. 5 illustrates another example of the fracturing event monitoring and detection system 402. The fracturing event monitoring and detection system 402 includes a data synchronization engine 502 and a data aggregation engine 504 the data synchronization engine 502 and the data aggregation engine 504 can perform various operations on the input data 404 to process the input data 404. Specifically, the data synchronization engine 502 and the data aggregation engine 504 can preprocess the input data 404 so that the data can be used in monitoring a fracturing operation and detecting events during the fracturing operation.

The data synchronization engine 502 functions to synchronize the input data 404 across data sources. Specifically, the data synchronization engine 502 can use an applicable technique for synchronizing the input data 404 across data sources. More specifically, the data synchronization engine 502 can temporally synchronize the input data 404 across data sources using an applicable technique. For example, the data synchronization engine 502 can temporally synchronize measurements gathered by wellhead pressure sensors.

The data aggregation engine 504 functions to aggregate the input data 404. Specifically, the data aggregation engine 504 can aggregate the input data 404 after the input data is synchronized by the data synchronization engine 502. The data aggregation engine 504 can use an applicable technique for grouping data to aggregate the input data 404. For example, the data aggregation engine 504 can aggregate the input data 404 based on the input data being related or unrelated. The resulting processed data from either or both the data synchronization engine 502 and the data aggregation engine 504 can be fed as processed data for event detection 506 to the data processing engine 406. In turn, the data processing engine 406 can analyze the processed data 506 to monitor and detect the occurrence of events during the fracturing process.

Figure 6:
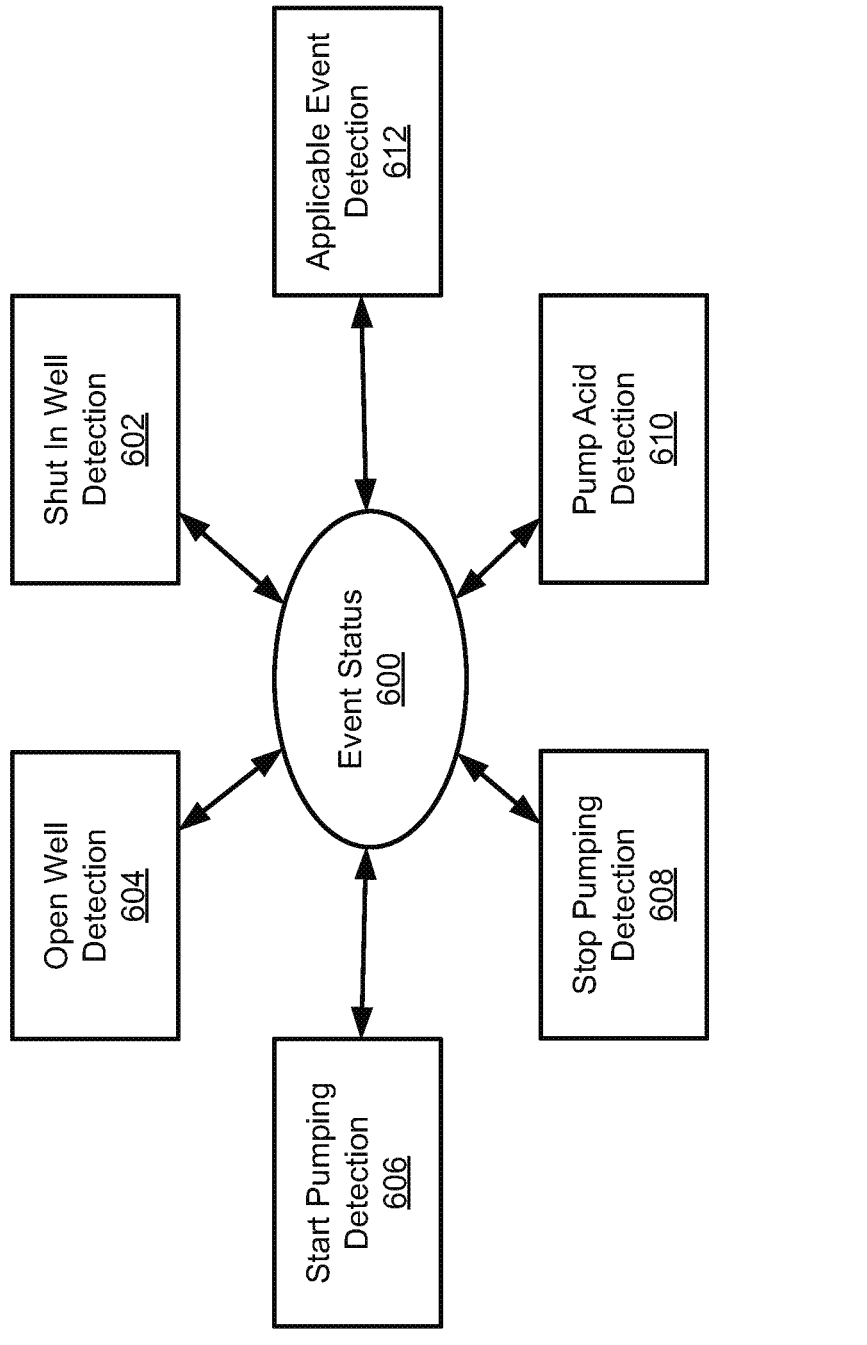
FIG. 6 is a schematic diagram of a plurality of different event detection algorithms that can be applied during a fracturing process, in accordance with various aspects of the subject technology.

FIG. 6 is a schematic diagram of a plurality of different event detection algorithms that can be applied during a fracturing process. Specifically, an event status 600 during a fracturing process can be formed based on application of one or an applicable combination of a shut in well event detection algorithm 602, an open well event detection algorithm 604, a start pumping event detection algorithm 606, a stop pumping event detection algorithm, a pump acid event detection algorithm 610, or an applicable number of other event detection algorithms 612.

The event detection algorithms can be implemented in a containerized manner. Specifically, different containers can run corresponding different ones of the event detection algorithms to monitor and detect events during a fracturing operation in real time. Real time, as used herein, can include actual time, virtually immediately, or within a threshold range to actual time.

The event detection algorithms can be customized or otherwise changed over the course of implementation across one or multiple fracturing operations. Specifically, an individual event detection algorithm can be modified to refine a event technique implemented through the algorithm. Further, entire event detection algorithms can be removed and added from the plurality of event detection algorithms. For example, a customer can add event detection algorithms to its unique group of event detection algorithms that are applied to a fracturing operation associated with the customer.

The subject matter described herein can be used in detecting both an open well event and a shut in well event. An open well event includes when a flow path between surface equipment and a wellbore is created thereby connecting the surface equipment to the wellbore. A shut in well event includes when a flow path between surface equipment and a wellbore is removed thereby disconnecting the surface equipment from the wellbore. For example, a shut in well event can include closing one or more valves to disconnect the wellhead and surface equipment without removing or disconnecting the physical connections between the wellhead and surface equipment.

An open well event detection algorithm can analyze well pressure data, e.g. as part of the input data 404, in detecting an open well event. Specifically, an open well event detection algorithm can analyze wellhead pressure data, e.g. as part of the input data 404, in detecting an open well event. Well pressure data can include applicable data describing pressure conditions at one or more positions within a wellbore. Wellhead pressure data can include applicable data describing pressure conditions at or in proximity to a wellhead of a wellbore.

Figure 7A:
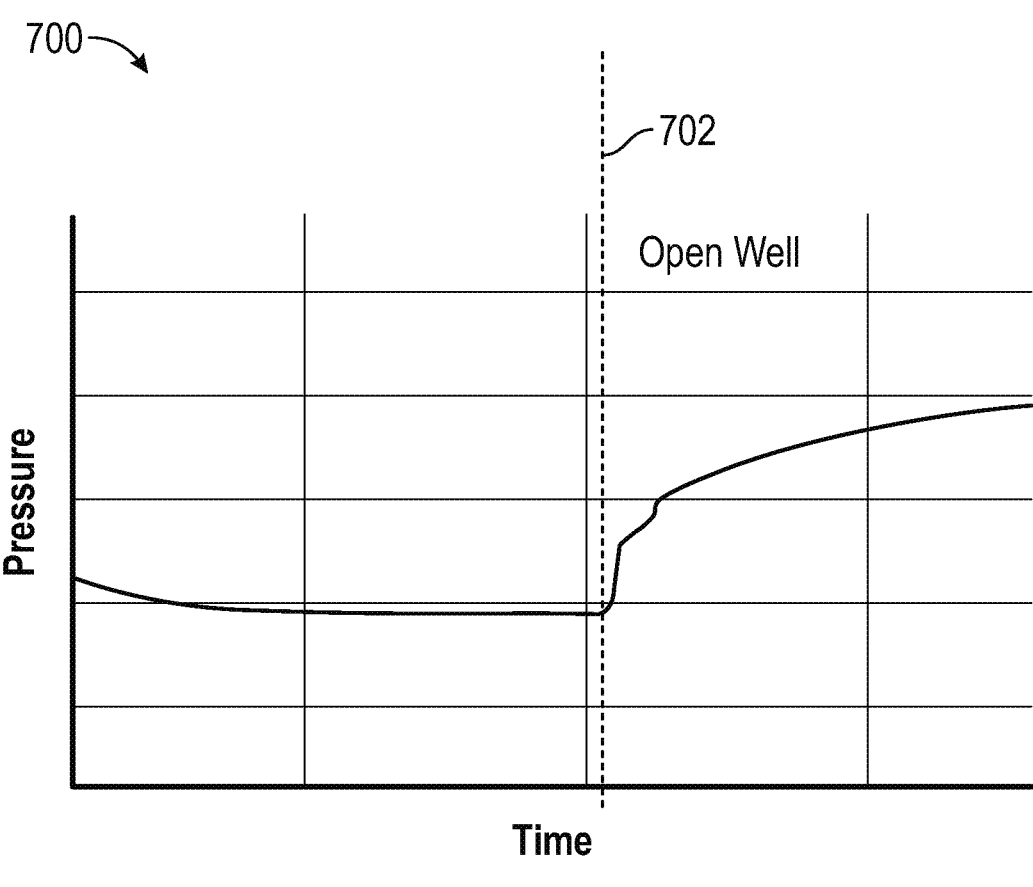
FIG. 7A is a graph of wellhead pressure as a function of time during an open well event, in accordance with various aspects of the subject technology.
Figure 7B:
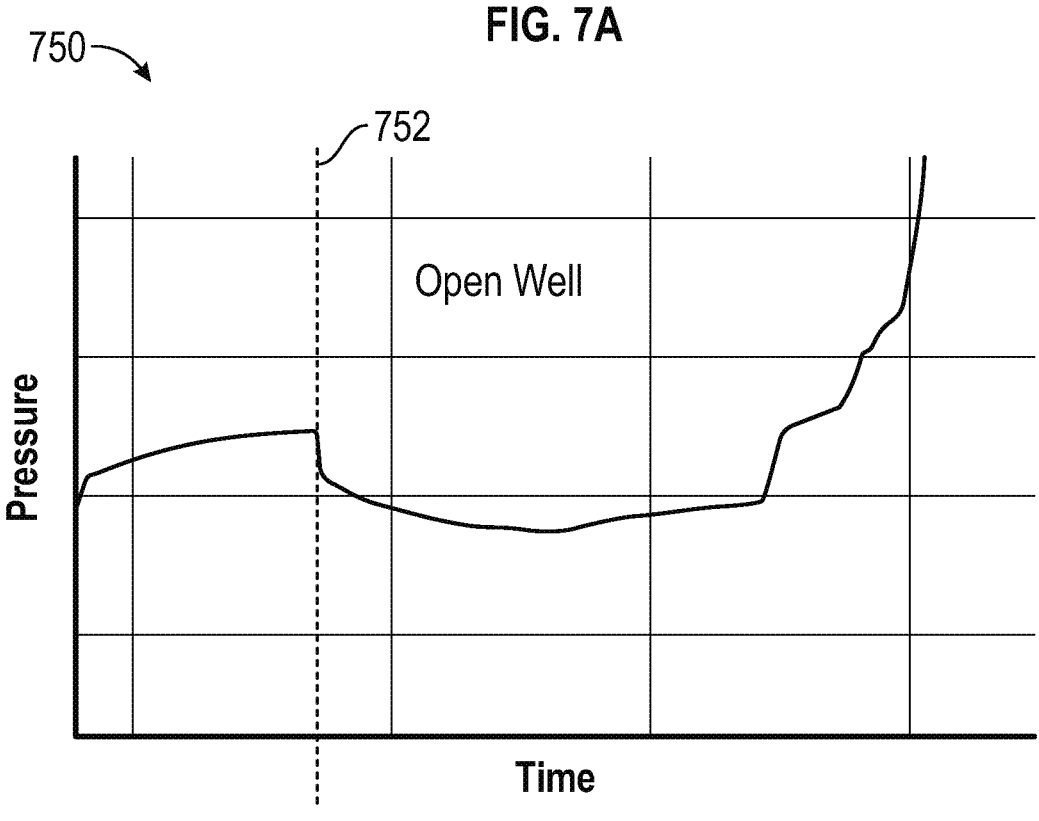
FIG. 7B is another graph of wellhead pressure as a function of time during an open well event, in accordance with various aspects of the subject technology.

FIG. 7A is a graph 700 of wellhead pressure as a function of time during an open well event. FIG. 7B is another graph 750 of wellhead pressure as a function of time during an open well event. With reference to FIG. 7A, the open well event is shown to occur in relation to line 702. In particular, pressure was brought down from pressure test until it reached a steady state. The well was then opened and pressure and a sudden increase in pressure is observed due to the higher pressure inside the wellbore. With reference to FIG. 7B, the open well event is shown to occur in relation to line 752. In particular, the open well event is indicated by a sudden decrease in pressure, e.g. due to higher pressure in the surface equipment than the pressure inside the wellbore.

As both a sudden decrease and a sudden increase in wellhead pressure can indicate an open well event, an open well event detection algorithm can rely on a slope of wellhead pressure over time to identify an occurrence of an open well event. Specifically, an open well event detection algorithm can utilize a slope of wellhead pressure in comparison to a threshold slope to determine whether an open well event has occurred. More specifically, an open well event detection algorithm can identify an occurrence of an open well event if a slope of wellhead pressure is greater than a threshold amount. The threshold amount can be a pre-determined amount that is set as part of developing or updating the open well event detection algorithm. Further, the threshold amount can be set by analyzing historical data on either or both a current wellbore that is being monitored or different monitored wellbore(s).

Figures 8, 9:
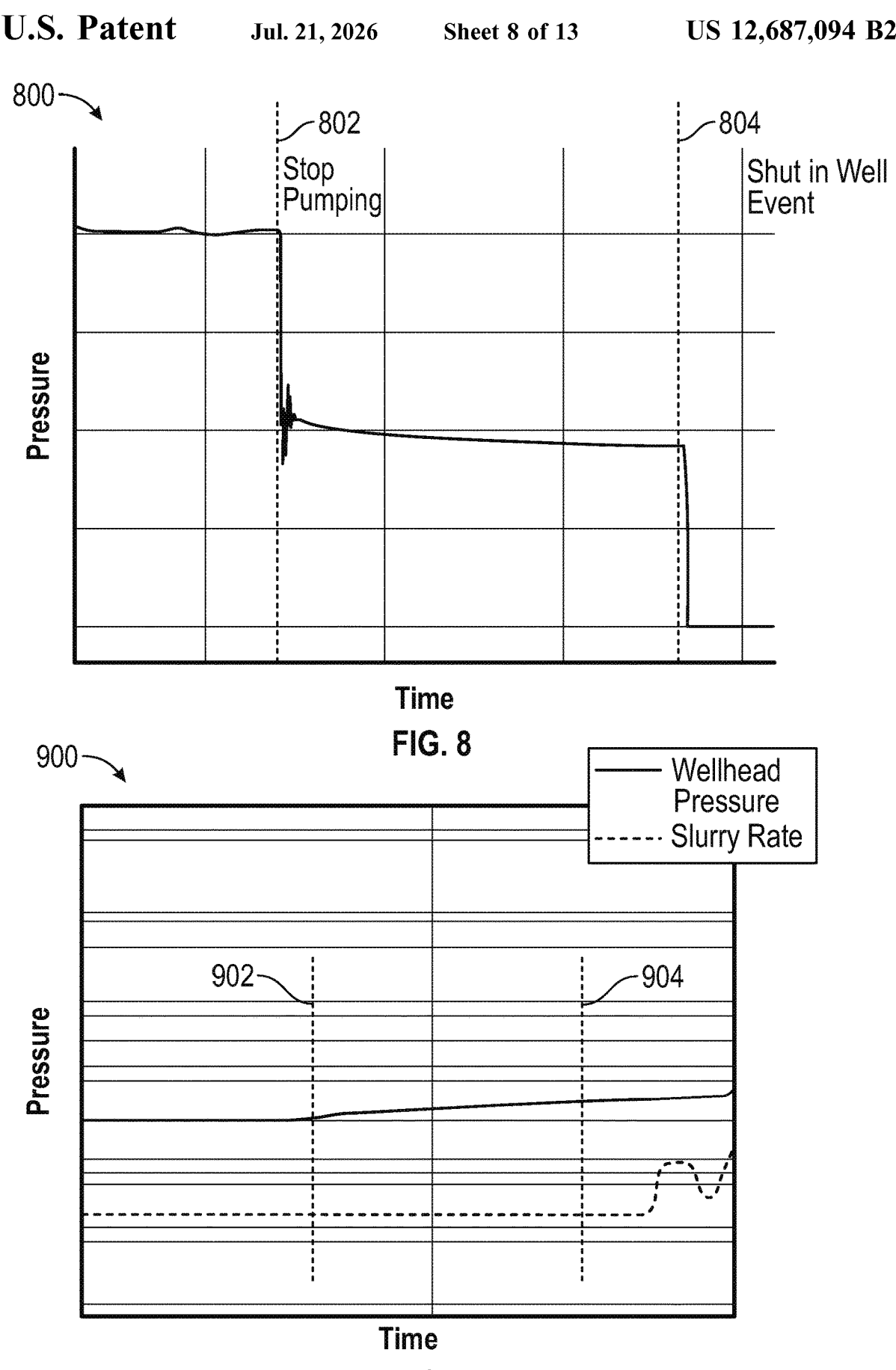
FIG. 8 is a graph of wellhead pressure as a function of time during a stop pumping well event and a shut in well event, in accordance with various aspects of the subject technology.
FIG. 9 shows a graph of wellhead pressure and slurry rate over time during a ball seat event and corresponding pressure breakdown event in a wellbore, in accordance with various aspects of the subject technology.

FIG. 8 is a graph 800 of wellhead pressure as a function of time during a stop pumping well event and a shut in well event. As shown in FIG. 8, the stop pumping event occurs in relation to line 802. Further, the shut in well event occurs in relation to line 804. When shut in occurs, the flow path between surface equipment and the wellbore is disconnected. As a result, the pressure in the surface equipment is released and drops to near zero, thereby causing a sudden decrease in wellhead pressure, as shown in graph 800.

A shut in well event detection algorithm can rely on a slope of wellhead pressure over time to identify an occurrence of a shut in well event. Specifically, a shut in well event detection algorithm can utilize a slope of wellhead pressure in comparison to a threshold slope to determine whether a shut in well event has occurred. More specifically, a shut in well event detection algorithm can determine an occurrence of a shut in well event when the slope of the wellhead pressure drops below a threshold amount. The threshold amount can be a pre-determined amount that is set as part of developing or updating the open well event detection algorithm. Further, the threshold amount can be set by analyzing historical data on either or both a current wellbore that is being monitored or different monitored wellbore(s).

Either or both an open well event and a shut in well event can be used in monitoring for other events during a fracturing operation. Specifically, either or both an open well event and a shut in well event can trigger application of a specific event detection algorithm to monitor a specific event. For example, a ball seat event detection algorithm can be selected based on an identified occurrence of an open well event. As follows, the ball seat event detection algorithm can be applied in response to the occurrence of the open well event in order to detect an occurrence of the ball seat event after the open well event. In another example, a shut in well event can indicate that events associated with wireline can proceed, e.g. for taking over the well operation or perforate for the next treatment.

The subject matter described herein can also be used in detecting both a ball seat event and a pressure breakdown event. A stimulation process on a treatment starts with pumping into the well with pad fluid and then waiting for the ball to seat on the plug. As follows, a ball seat event includes when a ball is pumped down and seats on a plug during a fracturing operation. Then fluid and slurry is pumped after the ball seat event to cause a pressure breakdown event downhole. A pressure breakdown event includes when a formation that is surrounding a wellbore is accessed through the wellbore during a fracturing operation and breaks or otherwise fractures during the operation.

FIG. 9 shows a graph 900 of wellhead pressure and slurry rate over time during a ball seat event and corresponding pressure breakdown event in a wellbore. A ball seat event occurs at line 902 in the wellbore. After the ball seat event, a pressure breakdown event occurs at line 904 in the wellbore. The slurry rate is sometimes kept constant waiting for the breakdown event or sometimes the rate is ramped to design rate when the breakdown event happens.

A pressure breakdown event can be detected through application of a pressure breakdown event detection algorithm. The algorithm can analyze a dimensionless ratio of a volume of matter, e.g. slurry, pumped into a wellbore after a ball seat event and a displacement volume of the wellbore to determine whether or not a breakdown event has occurred. A displacement volume of the wellbore that is analyzed by the pressure breakdown event detection algorithm can include a displacement volume of the wellbore to a treatment depth of a stage of a fracturing operation. The treatment depth can be measured from the ball or other physical device that is used to isolate a portion of the wellbore during a stage of a fracturing operation. For example, a displacement volume of the wellbore to a treatment depth of a stage of a fracturing operation can include a volume from a wellbore head to a ball after it is placed during a ball seat event. Additionally, treatment depth can be determined from a wireline perforation operation that is associated with a fracturing operation.

Figure 10A:
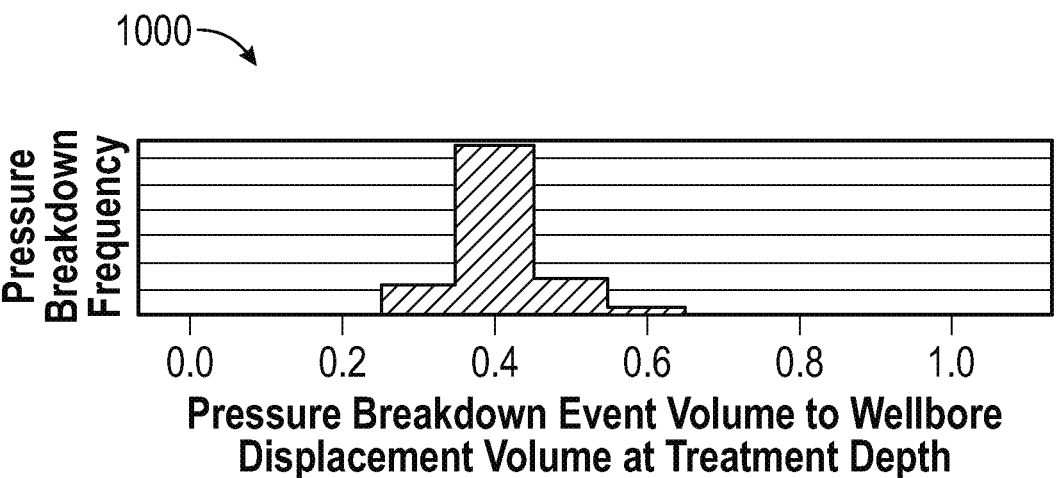
FIG. 10A is a histogram of pressure breakdown event volume to wellbore displacement volume at treatment depth, in accordance with various aspects of the subject technology.
Figure 10B:
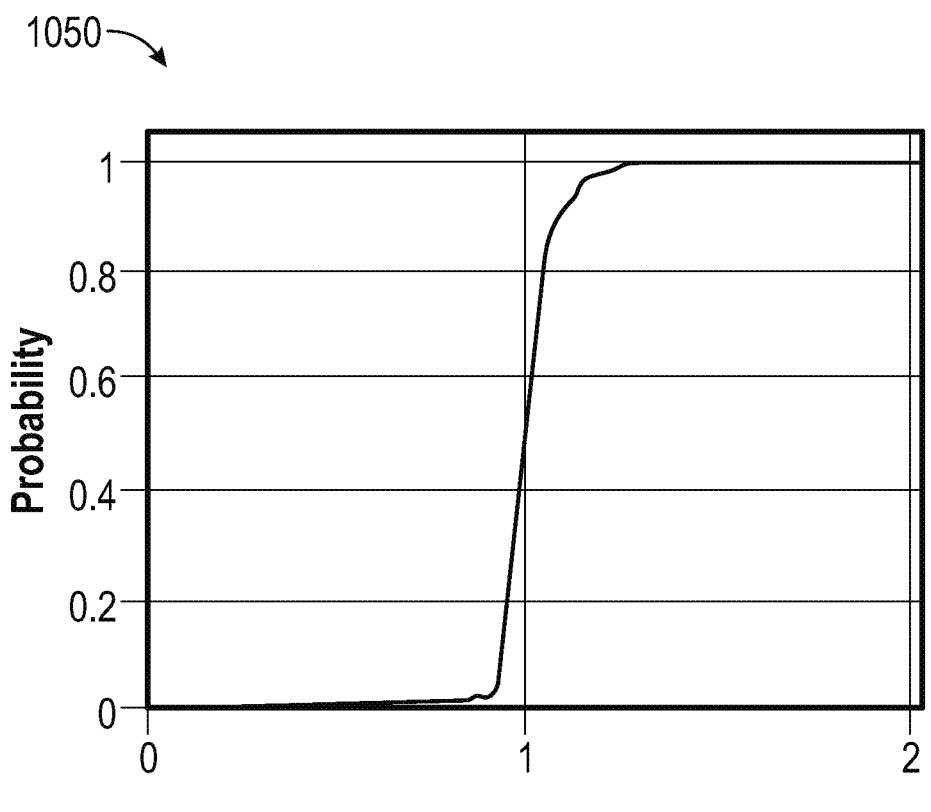
FIG. 10B is a cumulative density plot of pressure breakdown event volume to wellbore displacement volume at treatment depth, in accordance with various aspects of the subject technology.

FIG. 10A is a histogram 1000 of pressure breakdown event volume to wellbore displacement volume at treatment depth. FIG. 10B is a cumulative density plot 1050 of pressure breakdown event volume to wellbore displacement volume at treatment depth. As shown in FIGS. 10A and 10B, the pressure breakdown event can happen around one wellbore volume to treatment depth, e.g. +/−20% of volume to treatment depth.

Figure 11A:
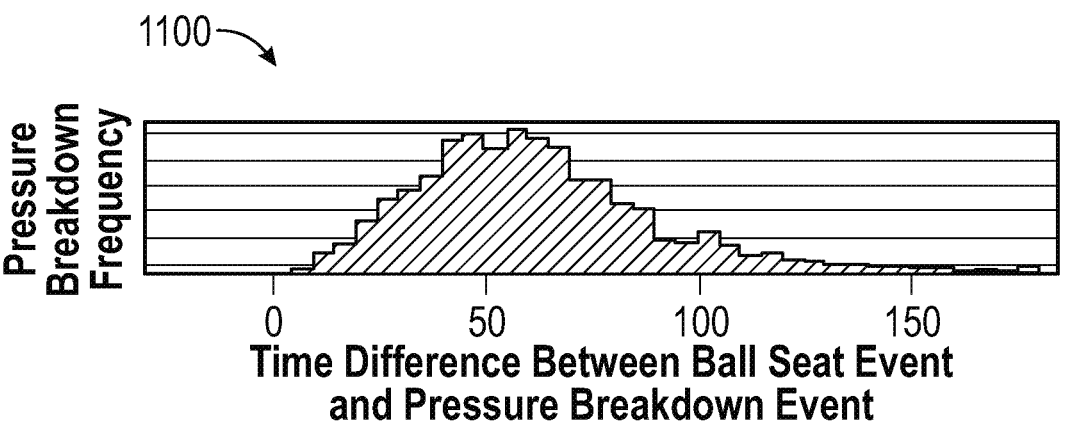
FIG. 11A is a histogram of the time difference between ball seat events and pressure breakdown events, in accordance with various aspects of the subject technology.
Figure 11B:
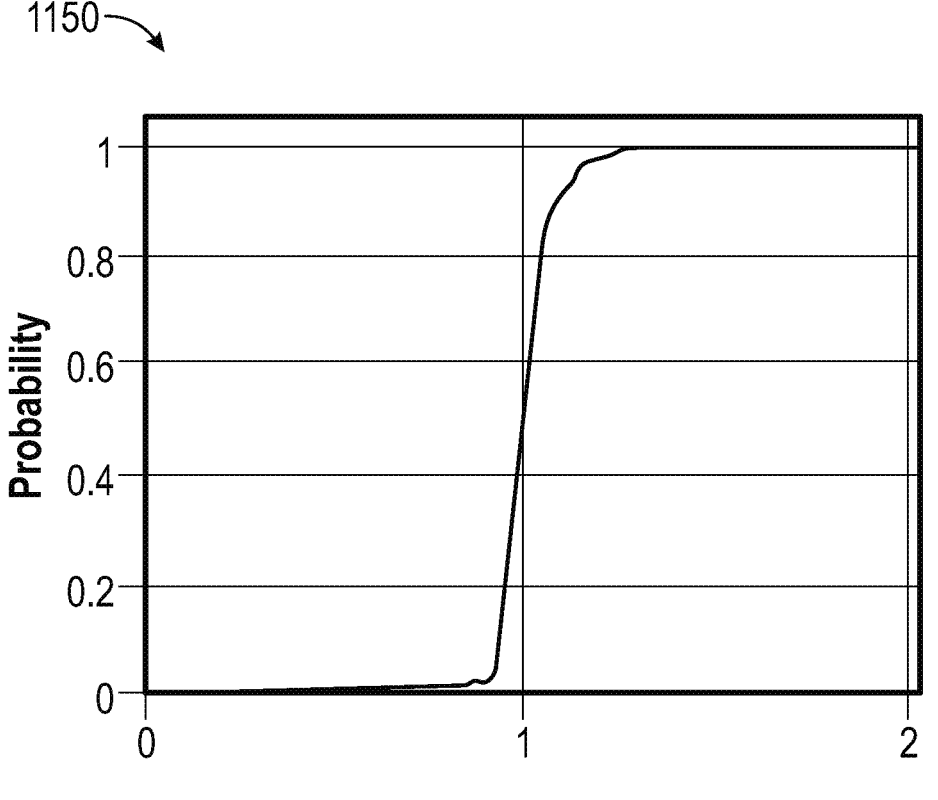
FIG. 11B is a cumulative density plot of the time difference between ball seat events and pressure breakdown events, in accordance with various aspects of the subject technology.

FIG. 11A is a histogram 1100 of the time difference between ball seat events and pressure breakdown events. FIG. 11B is a cumulative density plot 1150 of the time difference between ball seat events and pressure breakdown events. As shown in FIGS. 11A and 11B, the pressure breakdown event can happen around 120 second of the ball seat event.

Figure 12A:
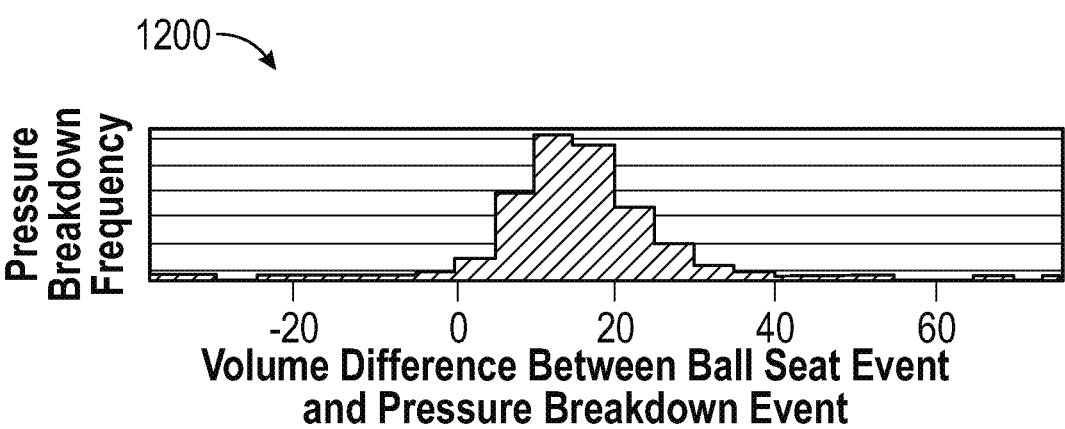
FIG. 12A is a histogram of the volume difference between ball seat events and pressure breakdown events, in accordance with various aspects of the subject technology.
Figure 12B:
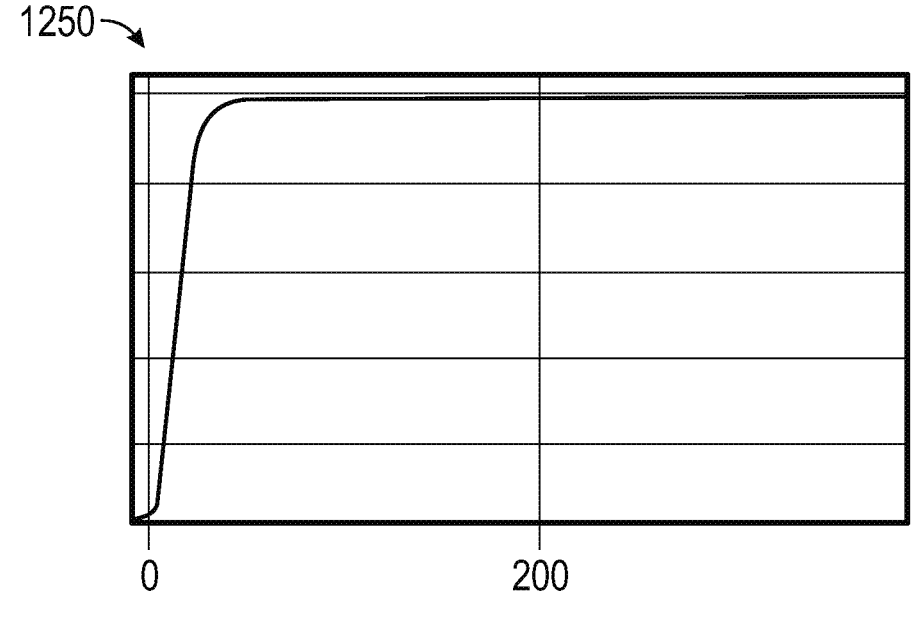
FIG. 12B is a cumulative density plot of the volume difference between ball seat events and pressure breakdown events, in accordance with various aspects of the subject technology.

FIG. 12A is a histogram 1200 of the volume difference between ball seat events and pressure breakdown events. FIG. 12B is a cumulative density plot 1150 of the volume difference between ball seat events and pressure breakdown events. As shown in FIGS. 12A and 12B, the volume different between the ball seat event and the pressure break down event can be around 40 barrels of material. Further, over 80 percent of pressure break down events can happen after 10 or more barrels of material is pumped after the ball seat event.

Figure 13:
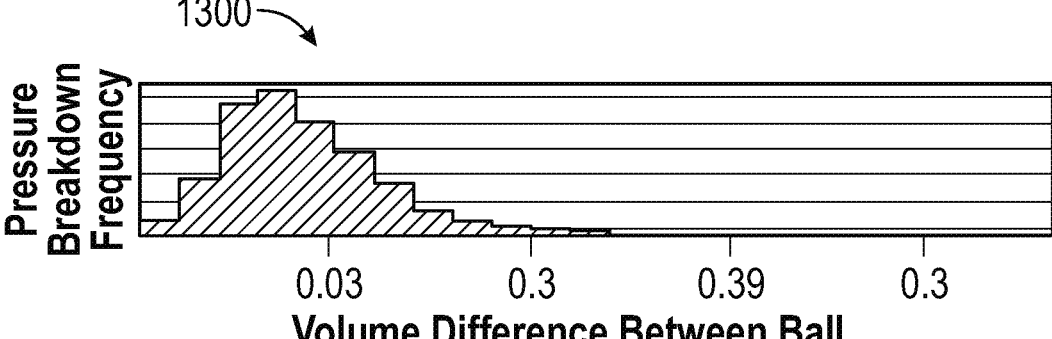
FIG. 13 is a histogram of the dimensionless ratio of displacement volume at treatment depth and a volume of material pumped between corresponding ball seat events and pressure breakdown events, in accordance with various aspects of the subject technology.

The volume difference, represented in FIGS. 12A and 12B, can be divided by the displacement volume at treatment depth to identify the ultimate dimensionless volume ratio that is used in determining whether a pressure breakdown event occurs. FIG. 13 is a histogram 1300 of the dimensionless ratio of displacement volume at treatment depth and a volume of material pumped between corresponding ball seat events and pressure breakdown events. As shown in FIG. 13, the dimensionless volume ratio the corresponds to a pressure breakdown event can be around 0.1.

Figure 14:
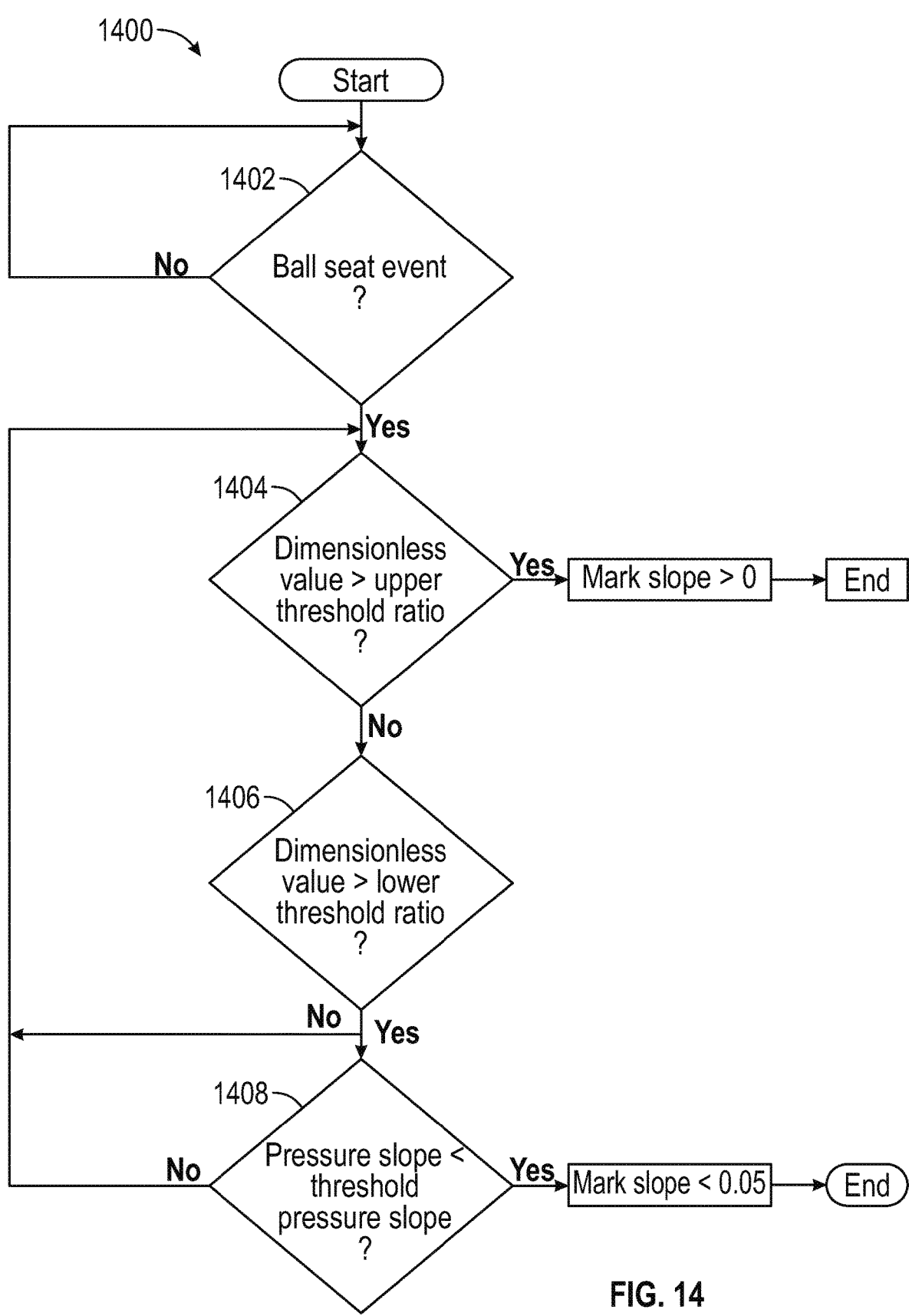
FIG. 14 illustrates a flowchart for an example method of identifying whether or not a pressure breakdown event has occurred based on wellbore pressure, in accordance with various aspects of the subject technology.

FIG. 14 illustrates a flowchart 1400 for an example method of identifying whether or not a pressure breakdown event has occurred based on pressure associated with a wellbore. The method shown in FIG. 14 is provided by way of example, as there are a variety of ways to carry out the method. Additionally, while the example method is illustrated with a particular order of steps, those of ordinary skill in the art will appreciate that FIG. 14 and the modules shown therein can be executed in any order and can include fewer or more modules than illustrated. Each module shown in FIG. 14 represents one or more steps, processes, methods or routines in the method.

The flowchart 1400 can be triggered/started in response to one or more specific events occurring during a fracturing operation. For example, the flowchart 1400 can be triggered after detection of either or both a start pumping event and an open well event. The flowchart 1400 begins at decision point 1402, where it is determined whether a ball seat event has occurred. If it is determined that a ball seat event has not occurred, then the flowchart begins again. This process can loop until a ball seat event is detected.

If it is determined that a ball seat event has occurred, then the flowchart 1400 continues to decision point 1404 where a dimensionless value is calculated in real time and compared to an upper threshold ratio value. Specifically, at decision point 1404 it is determined whether a dimensionless value is greater than an upper threshold ratio value. a dimensionless value, as used with reference to the flowchart 1400 is the dimensionless ratio between a displacement volume of a wellbore to treatment depth and a volume of matter that is pumped into the wellbore after the detected ball seat event. The upper threshold ratio is a set dimensionless ratio value that is greater than a lower threshold ratio that is also a set dimensionless ratio value. Both the upper threshold ratio value and the lower dimensionless ratio value can be pre-determined amounts that are set as part of developing or updating a pressure breakdown event detection algorithm. Further, both the upper and lower threshold ratio values can be set in relation to the dimensionless value by analyzing historical data on either or both a current wellbore that is being monitored or different monitored wellbore(s). Examples of upper and lower threshold ratio values include 0.085 and 0.01.

If it is determined at decision point 1404 that the dimensionless value is greater than the upper threshold ratio value, then the corresponding data used to calculate the dimensionless value in real time, e.g. wellhead pressure, is marked as representing a pressure breakdown event. If it is determined at decision point 1404 that the dimensionless value is less than the upper threshold ratio, then the flowchart 1400 continues to decision point 1406. At decision point 1406, it is determined whether the dimensionless value is greater than the lower threshold ratio value. If it is determined that the dimensionless value is less than the lower threshold ratio value, then the flowchart 1400 loops back to decision point 1404 where the dimensionless value is updated in real time and compared to the upper threshold ratio value.

If it is determined that the dimensionless value is greater than the lower threshold ratio value, then the flowchart 1400 continues to decision point 1408. At decision point 1408, it is determined whether a pressure slope of the measurements used in determining the dimensionless value is less than a threshold pressure slope value. The pressure slope of the measurements can include the pressure over time of a measured pressure associated with the wellbore, e.g. a wellhead pressure. The threshold pressure slope value can be a pre-determined amount that is set as part of developing or updating a pressure breakdown event detection algorithm. Further, the threshold pressure slope value can be set by analyzing historical data on either or both a current wellbore that is being monitored or different monitored wellbore(s).

At decision point 1408, if it is determined that the pressure slope is greater than the threshold pressure slope, then the flowchart 1400 continues back to decision point 1404. Alternatively, if it is determined that the pressure slope is less than the threshold pressure slope, then the corresponding data used to calculate the dimensionless value in real time, e.g. wellhead pressure, is marked as representing a pressure breakdown event. The method represented by the flowchart 1400 shown in FIG. 14 has demonstrated consistent results in detecting pressure breakdown events. Specifically, over 1022 treatments, the accuracy of the method was shown to be over 94% within a one minute window of when a pressure breakdown event is correctly identified by an operator.

While pressure slope is used as a constraint in determining whether a pressure breakdown event has occurred at decision point 1408, other applicable constraints associated with a fracturing operation can be used. Examples of such constraints include that the slurry rate should be fairly constant or increasing, that the second derivative of an applicable measurement, e.g. pressure, is negative past the ball seat event, that the slurry rate should be below 60 barrels per minute, or that the pressure associated with the wellbore goes to a peak and the slope flattens or becomes negative.

While various algorithms are discussed herein for detecting the occurrence of specific events, the algorithms can also detect whether an event has not occurred. Specifically, if an algorithm fails to detect an occurrence of a specific event, then the algorithm can determine that the specific event has not occurred. This can happen continuously and in real time for a specific amount of time, e.g. until the algorithm detects that the specific event has actually occurred.

Further, the technology described herein can be applied to different types of completions. For example, the event detection algorithms can be applied in plug and perf completions, sliding sleeve completions, and open hole completions. Additionally, the technology described herein can be applied during applicable operations associated with a hydraulic fracturing process. Specifically, event detection algorithms can be applied during main operations of a hydraulic fracturing operation and ancillary activities associated with the hydraulic fracturing operation. For example, an open well event detection algorithm can be applied to determine an open well event and that it is suitable to send a wireline down for perforation activities. In another example, a well shut in event detection algorithm can be used to detect a well shut in signifying that the wireline is off the wellhead.

The technology described herein can be applied across multiple wellbores, e.g. simultaneously. This is important as events in one well can affect operations on another well. For example, if two wells are pumping at the same time, both wells need to be open at the same time. Accordingly, an open well event detection algorithm can be applied to confirm that both wells are actually open at the same time. As follows, pumping can commence in both wells based on confirmation that both wells are open.

The event detection algorithms described herein can be maintained, or otherwise updated, at appropriate times and based on appropriate data. For example, event detection algorithms can be updated after one of more of a treatment completion, well completion, and a pad completion. Further, event detection algorithms can be updated based on data gathered during one or more previous treatment completions, well completions, and pad completions.

Figure 15:
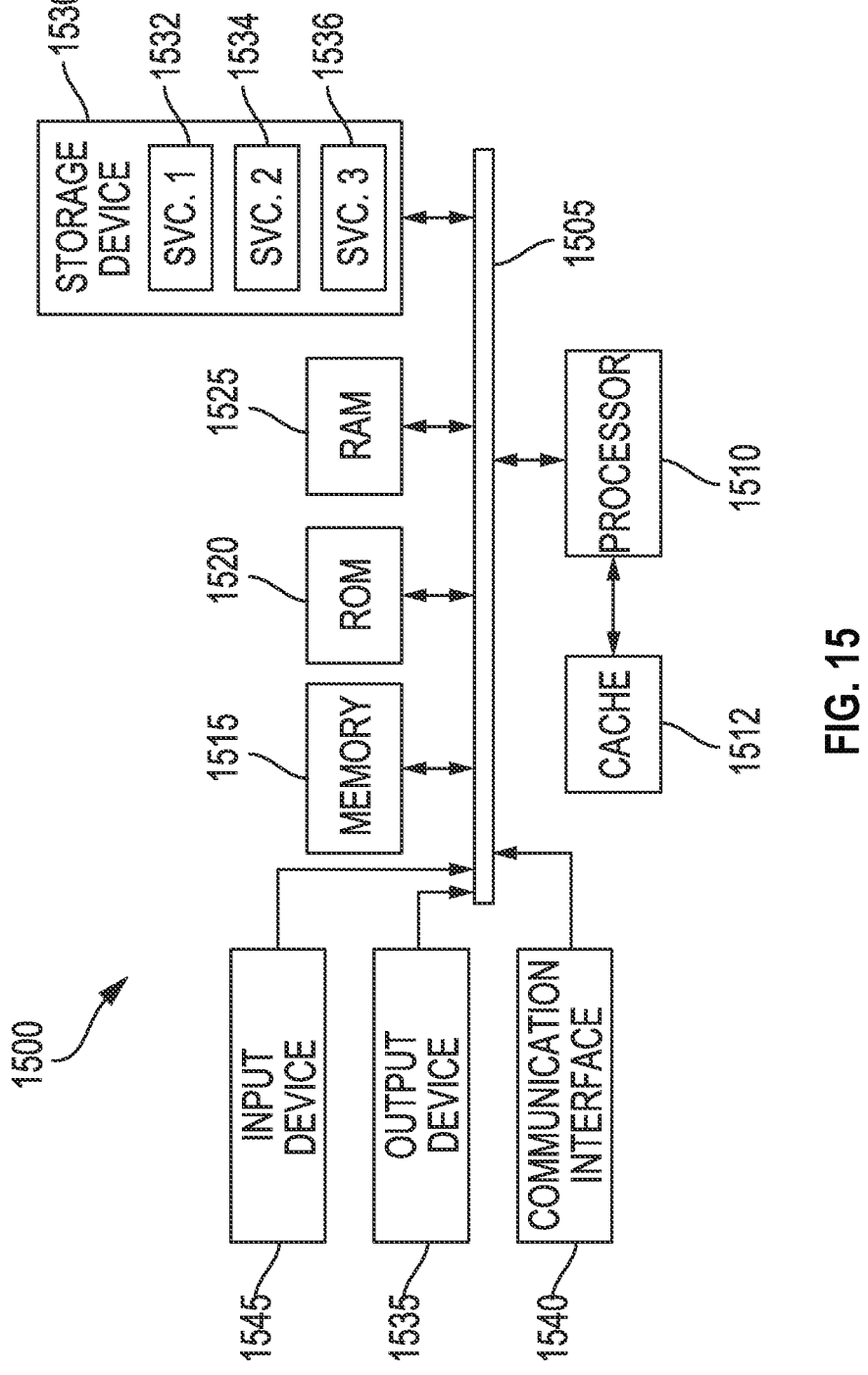
FIG. 15 illustrates an example computing device architecture which can be employed to perform various steps, methods, and techniques disclosed herein.

As noted above, FIG. 15 illustrates an example computing device architecture 1500 of a computing device which can implement the various technologies and techniques described herein. The various implementations will be apparent to those of ordinary skill in the art when practicing the present technology. Persons of ordinary skill in the art will also readily appreciate that other system implementations or examples are possible. The components of the computing device architecture 1500 are shown in electrical communication with each other using a connection 1505, such as a bus. The example computing device architecture 1500 includes a processing unit (CPU or processor) 1510 and a computing device connection 1505 that couples various computing device components including the computing device memory 1515, such as read only memory (ROM) 1520 and random access memory (RAM) 1525, to the processor 1510.

The computing device architecture 1500 can include a cache of high-speed memory connected directly with, in close proximity to, or integrated as part of the processor 1510. The computing device architecture 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other computing device memory 1515 may be available for use as well. The memory 1515 can include multiple different types of memory with different performance characteristics. The processor 1510 can include any general purpose processor and a hardware or software service, such as service 1 1532, service 2 1534, and service 3 1536 stored in storage device 1530, configured to control the processor 1510 as well as a special-purpose processor where software instructions are incorporated into the processor design. The processor 1510 may be a self-contained system, containing multiple cores or processors, a bus, memory controller, cache, etc. A multicore processor may be symmetric or asymmetric.

To enable user interaction with the computing device architecture 1500, an input device 1545 can represent any number of input mechanisms, such as a microphone for speech, a touch-sensitive screen for gesture input, keyboard, mouse, motion input, speech and so forth. An output device 1535 can also be one or more of a number of output mechanisms known to those of skill in the art, such as a display, projector, television, speaker device, etc. In some instances, multimodal computing devices can enable a user to provide multiple types of input to communicate with the computing device architecture 1500. The communications interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof. The storage device 1530 can include services 1532, 1534, 1536 for controlling the processor 1510. Other hardware or software modules are contemplated. The storage device 1530 can be connected to the computing device connection 1505. In one aspect, a hardware module that performs a particular function can include the software component stored in a computer-readable medium in connection with the necessary hardware components, such as the processor 1510, connection 1505, output device 1535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B. Statements of the Disclosure Include:

Statement 1. A method comprising accessing data related to performance of a fracturing operation in a wellbore during performance of a stage of the fracturing operation. The method can also comprise accessing an event detection algorithm for detecting a specific event that occurs during the fracturing operation. Further, the method can comprise applying, during at least a portion of the stage of the fracturing operation, the event detection algorithm to the data to determine whether the specific event actually occurs during the at least a portion of the stage of the fracturing operation. Additionally, the method can comprise generating an indication of the specific event occurring during the stage of the fracturing operation if it is determined that the specific event actually occurred during the at least a portion of the stage of the fracturing operation.

Statement 2. The method of statement 1, further comprising selecting the event detection algorithm from a plurality of event detection algorithms for detecting different events during the fracturing operation. The method can also comprise applying the event detection algorithm based on selection of the event detection algorithm from the plurality of event detection algorithms.

Statement 3. The method of statements 1 and 2, wherein the event detection algorithm is selected from the plurality of event detection algorithms based on detection of a related event during the fracturing operation.

Statement 4. The method of statements 1 through 3, wherein an occurrence of the specific event is dependent on an occurrence of at least a portion of the related event and a relation between the specific event and the related event defines an input constraint for the event detection algorithm.

Statement 5. The method of statements 1 through 4, wherein the event detection algorithm is selected based on satisfaction of the input constraint according to occurrence of at least a portion of the related event during the fracturing operation.

Statement 6. The method of statements 1 through 5, further comprising refraining from applying at least a subset of the plurality of event detection algorithms in response to selecting and applying the event detection algorithm.

Statement 7. The method of statements 1 through 6, wherein the data related to the performance of the fracturing operation includes equipment data related to performance of the fracturing operation, sensor data gathered during performance of the fracturing operation, treatment status data of the fracturing operation, or a combination thereof.

Statement 8. The method of statements 1 through 7, further comprising aggregating the data related to the performance of the fracturing operation from a plurality of data sources and synchronizing the data across the plurality of data sources in relation to performance of the fracturing operation.

Statement 9. The method of statements 1 through 8, further comprising adding the indication of the specific event occurring during the stage of the fracturing operation to an event log for the fracturing operation.

Statement 10. The method of statements 1 through 9, wherein the specific event is a pressure breakdown event occurring in relation to fracturing of a surrounding formation to the wellbore during the stage of the fracturing operation and the event detection algorithm is a pressure breakdown event detection algorithm.

Statement 11. The method of statements 1 through 10, wherein the pressure breakdown event detection algorithm is applied based on detection of a ball seat event occurring during the stage of the fracturing operation.

Statement 12. The method of statements 1 through 11, wherein the ball seat event is detected based on application of a ball seat event detection algorithm to the data related to the performance of the fracturing operation.

Statement 13. The method of statements 1 through 12, wherein the pressure breakdown event detection algorithm comprises determining a dimensionless ratio of a volume of matter pumped into the wellbore after a ball seat event during the stage of the fracturing operation and a displace-ment volume of the wellbore to a treatment depth of the stage of the fracturing operation. Further, the pressure breakdown event detection algorithm can comprise identifying an occurrence of the pressure breakdown event during the stage of the fracturing operation based on the dimensionless ratio.

Statement 14. The method of statements 1 through 13, wherein the pressure breakdown event detection algorithm further comprises comparing the dimensionless ratio to an upper threshold ratio that is defined with respect to a lower threshold ratio. Further, the pressure breakdown event detection algorithm can comprise detecting the occurrence of the pressure breakdown event based on a comparison of the dimensionless ratio to the upper threshold ratio.

Statement 15. The method of statements 1 through 14, wherein the pressure breakdown event detection algorithm further comprises comparing the dimensionless ratio to a lower threshold ratio that is defined with respect to an upper threshold ratio. Further, the pressure breakdown event detection algorithm can comprise detecting the occurrence of the pressure breakdown event based on a comparison of a slope of a pressure at a wellhead of the wellbore to a threshold pressure slope if the dimensionless ratio is less than the lower threshold ratio, wherein the slope of the pressure at the wellhead of the wellbore that is compared to the threshold pressure slope occurs after the ball seat event and during the stage of the fracturing operation.

Statement 16. The method of statements 1 through 15 further comprising detecting the occurrence of the pressure breakdown event at a corresponding time after the ball seat event and during the stage of the fracturing operation when the slope of the pressure associated with the wellbore is less than the threshold pressure slope.

Statement 17. The method of statements 1 through 16, wherein the specific event is an open well event occurring during the stage of the fracturing operation and the event detection algorithm is an open well event detection algorithm that compares pressure slope at a wellhead of the wellbore to a threshold pressure slope to identify the open well event.

Statement 18. The method of statements 1 through 17, further comprising selecting a ball seat event detection algorithm from a plurality of event detection algorithms based on identifying an occurrence of the open well event during the stage of the fracturing operation. Further, the method can comprise applying the ball seat event detection algorithm to the data related to the performance of the fracturing operation to detect an occurrence of a ball seat event after the open well event during the stage of the fracturing operation.

Statement 19. The method of statements 1 through 18, further comprising facilitating automated control of the fracturing operation based, at least in part, on the specific event occurring during the fracturing operation in response to determining that the specific event actually occurred during the at least a portion of the stage of the fracturing operation.

Statement 20. A system comprising one or more processors and at least one computer-readable storage medium having stored therein instructions. The instructions which, when executed by the one or more processors, cause the one or more processors to access data related to performance of a fracturing operation in a wellbore during performance of a stage of the fracturing operation. The instructions can also cause the one or more processors to access an event detection algorithm for detecting a specific event that occurs during the fracturing operation. Further, the instructions can cause the one or more processors to apply, during at least a portion of the stage of the fracturing operation, the event detection algorithm to the data to determine whether the specific event actually occurs during the at least a portion of the stage of the fracturing operation. Additionally, the instructions can cause the one or more processors to generate an indication of the specific event occurring during the stage of the fracturing operation if it is determined that the specific event actually occurred during the at least a portion of the stage of the fracturing operation.

Statement 21. A non-transitory computer-readable storage medium having stored therein instructions which, when executed by one or more processors, cause the one or more processors to access data related to performance of a fracturing operation in a wellbore during performance of a stage of the fracturing operation. The instructions can also cause the one or more processors to access an event detection algorithm for detecting a specific event that occurs during the fracturing operation. Further, the instructions can cause the one or more processors to apply, during at least a portion of the stage of the fracturing operation, the event detection algorithm to the data to determine whether the specific event actually occurs during the at least a portion of the stage of the fracturing operation. Additionally, the instructions can cause the one or more processors to generate an indication of the specific event occurring during the stage of the fracturing operation if it is determined that the specific event actually occurred during the at least a portion of the stage of the fracturing operation.

What is claimed is:

1. A method comprising:
accessing data related to performance of a fracturing operation in a wellbore during performance of a stage of the fracturing operation;
accessing an event detection algorithm for detecting a specific event that occurs during the fracturing operation;
applying, during at least a portion of the stage of the fracturing operation, the event detection algorithm to the data to determine whether the specific event actually occurs during the at least a portion of the stage of the fracturing operation;
generating an indication of the specific event occurring during the stage of the fracturing operation if it is determined that the specific event actually occurred during the at least a portion of the stage of the fracturing operation;
selecting the event detection algorithm from a plurality of event detection algorithms for detecting different events during the fracturing operation; and
applying the event detection algorithm based on selection of the event detection algorithm from the plurality of event detection algorithms, wherein the event detection algorithm is selected from the plurality of event detection algorithms based on detection of a related event during the fracturing operation.

2. The method of claim 1, wherein an occurrence of the specific event is dependent on an occurrence of at least a portion of the related event and a relation between the specific event and the related event defines an input constraint for the event detection algorithm.

3. The method of claim 2, wherein the event detection algorithm is selected based on satisfaction of the input constraint according to occurrence of at least a portion of the related event during the fracturing operation.

4. The method of claim 1, further comprising refraining from applying at least a subset of the plurality of event detection algorithms in response to selecting and applying the event detection algorithm.

5. The method of claim 1, wherein the data related to the performance of the fracturing operation includes equipment data related to performance of the fracturing operation, sensor data gathered during performance of the fracturing operation, treatment status data of the fracturing operation, or a combination thereof.

6. The method of claim 1, further comprising aggregating the data related to the performance of the fracturing operation from a plurality of data sources and synchronizing the data across the plurality of data sources in relation to performance of the fracturing operation.

7. The method of claim 1, further comprising adding the indication of the specific event occurring during the stage of the fracturing operation to an event log for the fracturing operation.

8. The method of claim 1, wherein the specific event is a pressure breakdown event occurring in relation to fracturing of a surrounding formation to the wellbore during the stage of the fracturing operation and the event detection algorithm is a pressure breakdown event detection algorithm.

9. The method of claim 8, wherein the pressure breakdown event detection algorithm is applied based on detection of a ball seat event occurring during the stage of the fracturing operation.

10. The method of claim 9, wherein the ball seat event is detected based on application of a ball seat event detection algorithm to the data related to the performance of the fracturing operation.

11. The method of claim 8, wherein the pressure breakdown event detection algorithm comprises:
determining a dimensionless ratio of a volume of matter pumped into the wellbore after a ball seat event during the stage of the fracturing operation and a displacement volume of the wellbore to a treatment depth of the stage of the fracturing operation; and
identifying an occurrence of the pressure breakdown event during the stage of the fracturing operation based on the dimensionless ratio.

12. The method of claim 11, wherein the pressure breakdown event detection algorithm further comprises:
comparing the dimensionless ratio to an upper threshold ratio that is defined with respect to a lower threshold ratio; and
detecting the occurrence of the pressure breakdown event based on a comparison of the dimensionless ratio to the upper threshold ratio.

13. The method of claim 11, wherein the pressure breakdown event detection algorithm further comprises:
comparing the dimensionless ratio to a lower threshold ratio that is defined with respect to an upper threshold ratio; and
detecting the occurrence of the pressure breakdown event based on a comparison of a slope of a pressure at a wellhead of the wellbore to a threshold pressure slope if the dimensionless ratio is less than the lower threshold ratio, wherein the slope of the pressure at the wellhead of the wellbore that is compared to the threshold pressure slope occurs after the ball seat event and during the stage of the fracturing operation.

14. The method of claim 13, further comprising detecting the occurrence of the pressure breakdown event at a corresponding time after the ball seat event and during the stage of the fracturing operation when the slope of the pressure associated with the wellbore is less than the threshold pressure slope.

15. The method of claim 1, wherein the specific event is an open well event occurring during the stage of the fracturing operation and the event detection algorithm is an open well event detection algorithm that compares pressure slope at a wellhead of the wellbore to a threshold pressure slope to identify the open well event.

16. The method of claim 15, further comprising:

selecting a ball seat event detection algorithm from a plurality of event detection algorithms based on identifying an occurrence of the open well event during the stage of the fracturing operation; and applying the ball seat event detection algorithm to the data related to the performance of the fracturing operation to detect an occurrence of a ball seat event after the open well event during the stage of the fracturing operation.

17. The method of claim 1, further comprising facilitating automated control of the fracturing operation based, at least in part, on the specific event occurring during the fracturing operation in response to determining that the specific event actually occurred during the at least a portion of the stage of the fracturing operation.

18. A system comprising:

one or more processors; and at least one computer-readable storage medium having stored therein instructions which, when executed by the one or more processors, cause the one or more processors to:

access data related to performance of a fracturing operation in a wellbore during performance of a stage of the fracturing operation;

access an event detection algorithm for detecting a specific event that occurs during the fracturing operation;

apply, during at least a portion of the stage of the fracturing operation, the event detection algorithm to the data to determine whether the specific event actually occurs during the at least a portion of the stage of the fracturing operation;

generate an indication of the specific event occurring during the stage of the fracturing operation if it is determined that the specific event actually occurred during the at least a portion of the stage of the fracturing operation;

select the event detection algorithm from a plurality of event detection algorithms for detecting different events during the fracturing operation; and apply the event detection algorithm based on selection of the event detection algorithm from the plurality of event detection algorithms, wherein the event detection algorithm is selected from the plurality of event detection algorithms based on detection of a related event during the fracturing operation.

19. A non-transitory computer-readable storage medium having stored therein instructions which, when executed by one or more processors, cause the one or more processors to:

access data related to performance of a fracturing operation in a wellbore during performance of a stage of the fracturing operation;

access an event detection algorithm for detecting a specific event that occurs during the fracturing operation;

apply, during at least a portion of the stage of the fracturing operation, the event detection algorithm to the data to determine whether the specific event actually occurs during the at least a portion of the stage of the fracturing operation;

generate an indication of the specific event occurring during the stage of the fracturing operation if it is determined that the specific event actually occurred during the at least a portion of the stage of the fracturing operation;

select the event detection algorithm from a plurality of event detection algorithms for detecting different events during the fracturing operation; and apply the event detection algorithm based on selection of the event detection algorithm from the plurality of event detection algorithms, wherein the event detection algorithm is selected from the plurality of event detection algorithms based on detection of a related event during the fracturing operation.

* * * * *